United States Patent
Kotay et al.

(10) Patent No.: US 11,564,092 B2
(45) Date of Patent: *Jan. 24, 2023

(54) METHODS AND SYSTEMS FOR AUTOMATICALLY CONNECTING TO A NETWORK

(71) Applicant: COMCAST CABLE COMMUNICATIONS, LLC, Philadelphia, PA (US)

(72) Inventors: Sreekant Kotay, Philadelphia, PA (US); John Robinson, South Riding, VA (US); Jacob Gladish, Blue Bell, PA (US); Robert Seamon, Sicklerville, NJ (US)

(73) Assignee: COMCAST CABLE COMMUNICATIONS, LLC, Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/501,977

(22) Filed: Oct. 14, 2021

(65) Prior Publication Data

US 2022/0109988 A1  Apr. 7, 2022

Related U.S. Application Data

(63) Continuation of application No. 16/275,044, filed on Feb. 13, 2019, now Pat. No. 11,184,768, which is a continuation-in-part of application No. 15/787,436, filed on Oct. 18, 2017, now Pat. No. 11,184,767.

(60) Provisional application No. 62/629,788, filed on Feb. 13, 2018, provisional application No. 62/411,277, filed on Oct. 21, 2016.

(51) Int. Cl.
| | | |
|---|---|---|
| H04W 12/06 | (2021.01) | |
| H04W 12/04 | (2021.01) | |
| H04W 76/10 | (2018.01) | |
| H04L 9/08 | (2006.01) | |
| H04W 12/03 | (2021.01) | |

(52) U.S. Cl.
CPC ........... *H04W 12/06* (2013.01); *H04L 9/0866* (2013.01); *H04W 12/03* (2021.01); *H04W 12/04* (2013.01); *H04W 76/10* (2018.02)

(58) Field of Classification Search
CPC .................................................... H04W 12/06
See application file for complete search history.

(56) References Cited

U.S. PATENT DOCUMENTS

| | | | |
|---|---|---|---|
| 7,568,092 B1 * | 7/2009 | Englund | G06F 21/335 |
| | | | 713/168 |
| 8,601,317 B2 | 12/2013 | Sugaya | |
| 8,631,471 B2 | 1/2014 | Dattagupta et al. | |
| 8,903,318 B2 | 12/2014 | Adamovsky | |
| 8,931,067 B2 | 1/2015 | Haddad et al. | |

(Continued)

*Primary Examiner* — Bradley W Holder
(74) *Attorney, Agent, or Firm* — Ballard Spahr LLP

(57) ABSTRACT

A user device may connect to a wireless network despite the user device lacking the correct network credentials to access the wireless network. When the user device is unable to connect to a first network due to an incorrect network credential, the user device may automatically connect to a second network to obtain the correct network credentials associated with the first network. The network credentials associated with the first network may enable the user device to then connect and/or reconnect to the first network.

26 Claims, 8 Drawing Sheets

(56) References Cited

U.S. PATENT DOCUMENTS

| | | |
|---|---|---|
| 9,178,868 B1 | 11/2015 | Leung et al. |
| 9,241,367 B2 | 1/2016 | Chen et al. |
| 2005/0181734 A1 | 5/2005 | Coutts et al. |
| 2006/0236105 A1* | 10/2006 | Brok .................... H04W 12/50 713/169 |
| 2006/0270350 A1 | 11/2006 | Kim |
| 2007/0021104 A1 | 1/2007 | Kim |
| 2007/0082659 A1 | 4/2007 | Nevalainen |
| 2007/0130296 A1 | 6/2007 | Kim |
| 2010/0115108 A1 | 5/2010 | Wang et al. |
| 2011/0013569 A1 | 1/2011 | Scherzer et al. |
| 2011/0171909 A1 | 7/2011 | Jung et al. |
| 2012/0044863 A1 | 2/2012 | Huang et al. |
| 2012/0317619 A1* | 12/2012 | Dattagupta ........... H04W 12/50 726/4 |
| 2013/0219032 A1 | 8/2013 | Hsu |
| 2014/0064198 A1 | 3/2014 | Pan et al. |
| 2016/0037439 A1* | 2/2016 | Shamis .................. H04W 4/02 370/329 |
| 2018/0115892 A1 | 4/2018 | Kotay et al. |

\* cited by examiner

METHODS AND SYSTEMS FOR AUTOMATICALLY CONNECTING TO A NETWORK

CROSS REFERENCE TO RELATED APPLICATIONS

This application is a continuation of U.S. application Ser. No. 16/275,044, filed on Feb. 13, 2019, which claims priority to and is a continuation-in-part of U.S. application Ser. No. 15/787,436 filed Oct. 18, 2017, which claims priority to U.S. Provisional Application No. 62/411,277 filed Oct. 21, 2016, the contents of each of which are hereby incorporated herein by reference. U.S. application Ser. No. 16/275,044 (which this application claims priority to) also claims priority to U.S. Provisional Application No. 62/629,788 filed Feb. 13, 2018, the contents of each of which are hereby incorporated herein by reference.

BACKGROUND

Wireless communication devices must be manually configured with a Wi-Fi service set identifier (SSID) and password of a Wi-Fi access point (AP) in order to access a network. In the event that the SSID or password is changed for the AP, each wireless communication device accessing the network through the AP must be manually reconfigured to regain access to the network. Manual configuration of wireless communication devices is a tedious task. Wireless communication devices need a way to connect to the AP in a manner that minimizes the impact of changes in SSIDs and/or passwords.

SUMMARY

It is to be understood that both the following general description and the following detailed description are explanatory only and are not restrictive. Methods and systems for onboard provisioning, connecting, and reconnecting a wireless communication device to a wireless network(s) are described.

Wireless communication devices (e.g., user devices) may connect to a wireless network(s) whenever network credentials for the wireless network(s) are required, such as when network credentials are provisioned (e.g., initialized, onboarded, etc . . . ), lost, reconfigured, and the like. Wireless communication devices may be provisioned with unique network credentials (e.g., stored network credentials, a network identifier, a service set identifier (SSID), a security element, a passcode, a password, etc . . . ) that may be communicated to a wireless access point (AP). The wireless access point may enable the wireless communication device to access a wireless network (or one or more wireless networks). The wireless communication device, based on an inability to connect to the wireless network (or one or more wireless networks) using normal network credentials (e.g., routine network credentials, previously provisioned network credentials, a network identifier, a service set identifier (SSID), a security element, a passcode, a password, etc . . . ) associated with the wireless network, may communicate with the access point using the unique network credentials to access a dedicated network for obtaining network credentials (e.g., updated normal network credentials, etc . . . ) needed to access the wireless network. The wireless communication device may obtain and use network credentials from the dedicated network to access the wireless network (or the one or more wireless networks).

When a wireless communication device (e.g., user device) is initially provisioned for and/or associated with a wireless communication service and/or wireless communication service provider (e.g., during an onboard process, etc . . . ) the wireless communication device may be configured with unique network credentials (e.g., stored network credentials, a network identifier, a service set identifier (SSID), a security element, a passcode, a password, etc . . . ). The wireless communication device may be unable to connect to and/or be in communication with a particular wireless network. The wireless communication device may be unable to connect to and/or be in communication with the particular wireless network because the particular wireless network requires network credentials (e.g., normal network credentials, routine network credentials, previously provisioned network credentials, a network identifier, a service set identifier (SSID), a security element, a passcode, a password, etc . . . ) associated with and/or specific to the wireless network. The network credentials (e.g., normal network credentials, routine network credentials, previously provisioned network credentials, a network identifier, a service set identifier (SSID), a security element, a passcode, a password, etc . . . ) associated with and/or specific to the wireless network may be provided to a wireless access point (AP). The network credentials associated with and/or specific to the wireless network may be provided to a wireless access point (AP) by a service provider of the wireless network. The service provider of the wireless network may be different from a service provider associated with the wireless access point (AP). The service provider of the wireless network and the service provider associated with the wireless access point (AP) may be the same. The wireless access point may store the network credentials. The wireless communication device may communicate the unique identifier to a wireless access point (AP). The wireless access point may enable the wireless communication device to access a dedicated network for obtaining network credentials needed to access the particular wireless network or (one or more wireless networks). The wireless communication device may obtain and use network credentials from the dedicated network to access the particular wireless network (or the one or more wireless networks).

This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of this specification, together with the description, serve to explain the principles of the methods and systems.

DETAILED DESCRIPTION

Figure 1:
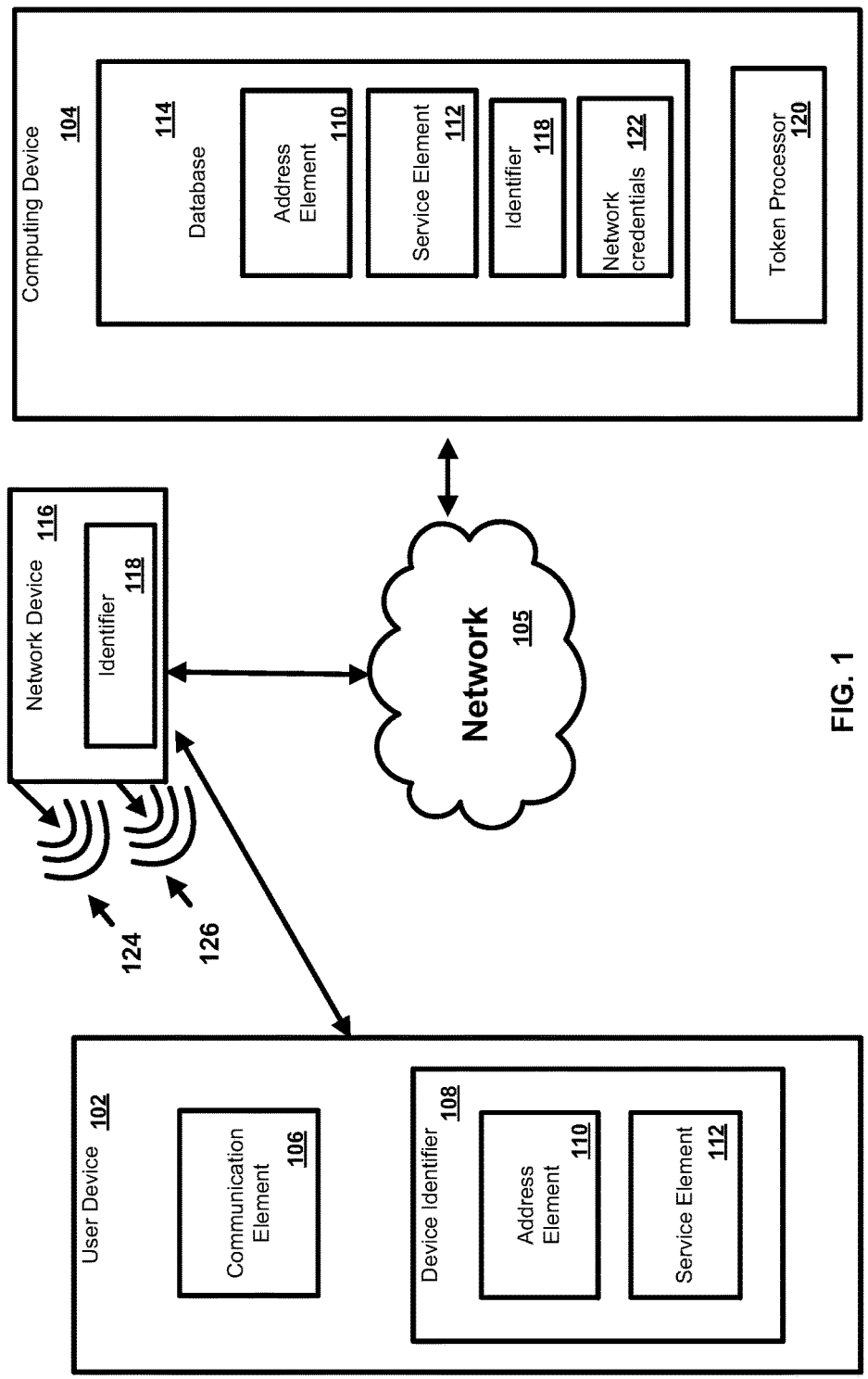
FIG. 1 shows a system for connecting to a network.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. When values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

"Content items," as the phrase is used herein, may also be referred to as "content," "content data," "content information," "content asset," "multimedia asset data file," or simply "data" or "information". Content items may be any information or data that may be licensed to one or more individuals (or other entities, such as business or group). Content may be electronic representations of video, audio, text and/or graphics, which may be but is not limited to electronic representations of videos, movies, or other multimedia, which may be but is not limited to data files adhering to MPEG2, MPEG, MPEG4 UHD, HDR, 4 k, Adobe® Flash® Video (.FLV) format or some other video file format whether such format is presently known or developed in the future. The content items described herein may be electronic representations of music, spoken words, or other audio, which may be but is not limited to data files adhering to the MPEG-1 Audio Layer 3 (.MP3) format, Adobe®, CableLabs 1.0, 1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. In some cases, content may be data files adhering to the following formats: Portable Document Format (.PDF), Electronic Publication (.EPUB) format created by the International Digital Publishing Forum (IDPF), JPEG (JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. Content items may be any combination of the above-described formats.

"Consuming content" or the "consumption of content," as those phrases are used herein, may also be referred to as "accessing" content, "providing" content, "viewing" content, "listening" to content, "rendering" content, or "playing" content, among other things. The particular term utilized may be dependent on the context in which it is used. Consuming video may also be referred to as viewing or playing the video. Consuming audio may also be referred to as listening to or playing the audio.

This detailed description may refer to a given entity performing some action. It should be understood that this language may in some cases mean that a system (e.g., a computer) owned and/or controlled by the given entity is actually performing the action.

Wireless communication devices (e.g., user devices) may connect to a wireless network(s) whenever network credentials for the wireless network(s) are required, such as when network credentials are provisioned (e.g., initialized, onboarded, etc . . . ), lost, reconfigured, and the like. A user device may be configured with unique network credentials (e.g., a network identifier, a service set identifier (SSID), a security element, a passcode, a password, etc . . . ) that may be communicated to a wireless access point (AP) that enables the user device to connect to the wireless network(s), such as in a situation when primary network credentials are required to connect to the wireless network(s). The network credentials (e.g., normal network credentials, routine network credentials, previously provisioned network credentials, a network identifier, a service set identifier (SSID), a security element, a passcode, a password, etc . . . ) may be associated with and/or specific to the wireless network(s). The network credentials may be provided to the wireless access point (AP). The network credentials may be provided to the wireless access point (AP) by a service provider of the wireless network(s). The service provider of the wireless network(s) may be different from a service provider associated with the wireless access point (AP). The service provider of the wireless network(s) and the service provider associated with the wireless access point (AP) may be the same. The wireless access point may store the network credentials. The user device may be unable to connect to a first network through an access point using the network credentials, such as a first identifier and a stored first password. The first network may be a local area network, wide area network, or a combination thereof. The first network may be managed, owned, or provided by a service provider. The unique network credentials (e.g., network identifier, service set identifier (SSID), security element, passcode, password, etc . . . ) for the first network may have been changed. The user device may then determine whether a token is locally stored and, if so, the user device may transmit the token to a validation server by first connecting to a second network through the access point using a stored network credentials (e.g., another network identifier, another service set identifier (SSID), security element, passcode, password, etc . . . ). The second network may be managed, owned, or provided by a different service provider than the first network. The access point may enable the user device to connect to and/or be in communication with the second network by various wireless communication techniques, such as Wi-Fi, cellular (e.g., long-term evolution (LTE), fourth generation wireless (4G), fifth generation wireless (5G), etc . . . ), BLUETOOTH®, and/or the like. The second network may be managed, owned, or provided by the same service provider or a different service provider as the first network. The second network may be configured for the specific purpose of providing a secure connection for provisioning the user device to access the first network (or another network). The token may contain data that identifies one or more of the user device, the user, and/or the first network. The validation server may maintain a database of user accounts and network credentials associated with those user accounts. The network credentials may include, identifiers (e.g., network identifiers, service identifiers, SSIDs, etc . . . ), passcodes, passwords, and the like for networks associated with users of the user accounts. Whenever network credentials are required to access a network(s) (e.g., the first network), such as when a change is made to an identifier, a passcode, a password, combinations thereof, and the like to the network(s), the changes may be transmitted to the validation server, The validation server may associate the network credentials with the user/user account and/or stored the network credentials for later use.

Upon receipt of the token, the validation server may use the token to determine a user/user account associated with the token, determine the network credentials associated with the user/user account, and transmit the network credentials back to the user device. The user device may then disconnect from the second network and use the received network credentials to automatically reconnect to the first network.

In the event the user device determines that no token is locally stored, the user device may request a token by connecting to the second network through the access point using the stored network credentials. Once the user device is connected to the second network, the user device may transmit the request for the token to the validation server. The request may comprise data such as a user login, a user password, a device identifier, an identifier associated with a service and/or service provider, combinations thereof, and the like. The validation server may use the data to determine that the user device is authorized to access the first network and may transmit the token to the user device. The user device may use the token to connect to and/or be in communication with the first network.

In one aspect of the disclosure, a system may be configured to provide services such as network-related services. FIG. 1 illustrates various aspects of an exemplary environment in which the present methods and systems may operate. Services, such as wireless connectivity services, may be provided to a user device (e.g., a computing device) or a device that serves a user device. Those skilled in the art will appreciate that present methods may be used in various types of networks and systems that employ both digital and analog equipment. One skilled in the art will appreciate that provided herein is a functional description and that the respective functions may be performed by software, hardware, or a combination of software and hardware.

The network and system may comprise a user device 102 in communication with a computing device 104 (e.g., validation server, a remote computing device, a server, etc.). The computing device 104 may be disposed locally or remotely relative to the user device 102. The user device 102 and the computing device 104 may be in communication via a network 105. The network 105 may comprise one or more networks, such as a wide area network (e.g., a provisioning network, a content network, service network, provider network, a first network, a second network, the Internet), a public network, an open network, a provider managed network, a non-user managed network, a provider controlled network, a non-user controlled network, a local network, a private network, a closed network, a user managed network, a user controlled network, a user deployed network, and/or the like. Other forms of communications may be used, such as wired and wireless telecommunication channels.

The user device 102 may be a wireless communication device, such as a computer, a smartphone, a laptop, a tablet, a set top box, a display device, or other device capable of communicating with the computing device 104. The user device 102 may be a computing device. The user device 102 may comprise a communication element 106 for providing an interface to a user to interact with the user device 102 and/or the computing device 104. The communication element 106 may be any interface for presenting information to the user and receiving a user feedback, such as an application client or a web browser (e.g., Internet Explorer, Mozilla Firefox, Google Chrome, Safari, or the like). Other software, hardware, and/or interfaces may be used to provide communication between the user and one or more of the user device 102 and the computing device 104. The communication element 106 may request or query various files from a local source and/or a remote source. The communication element 106 may transmit data to a local or remote device, such as the computing device 104.

The user device 102 may be associated with a user identifier or device identifier 108. The device identifier 108 may be any identifier, token, character, string, or the like, for differentiating one user and/or user device (e.g., user device 102) from another user or user device. In a further aspect, the device identifier 108 may identify a user or user device as belonging to a particular class of users or user devices. The device identifier 108 may comprise information relating to the user device, such as a manufacturer, a model or type of device, a service provider associated with the user device 102, a state of the user device 102, a locator, and/or a label or classifier. Other information may be represented by the device identifier 108.

The device identifier 108 may comprise an address element 110 and/or a service element 112. The address element 110 may be an internet protocol address, a MAC address, a network address, an Internet address, or the like. The address element 110 may be relied upon to establish a communication session between the user device 102 and the computing device 104 or other devices and/or networks. The address element 110 may be used as an identifier or locator of the user device 102. The address element 110 may be persistent for a particular network and/or location.

The service element 112 may comprise an identification of a service provider associated with the user device 102 and/or with the class of user device 102. The service element 112 may comprise information relating to or provided by a communication service provider (e.g., Internet service provider) that is providing or enabling communication services to the user device 102. The service element 112 may comprise information relating to a preferred service provider for one or more particular services relating to the user device 102. The address element 110 may be used to identify or retrieve the service element 112, or vice versa. One or more of the address element 110 and the service element 112 may be stored remotely from the user device 102 and retrieved by one or more devices, such as the user device 102 and the computing device 104. Other information may be represented by the service element 112.

The user device 102 may store network credentials 122. The network credentials 122 may comprise information such as SSIDs, passwords, security settings, device synchronization data, combinations thereof, and the like for one or more networks and/or network devices to which the user device 102 is authorized to connect. The network credentials 122 may comprise network credentials for accessing a network device 116. The network credentials 122 (e.g., normal network credentials, routine network credentials, previously provisioned network credentials, a network identifier, a service set identifier (SSID), service provider-specific network credentials, a security element, a passcode, a password, etc . . . ) may be associated with and/or specific to a wireless network(s). The network credentials 122 may be provided to the network device 116. The network credentials 122 may be provided to the network device 116 by a service provider of the wireless network(s). The service provider of the wireless network(s) may be different from a service provider associated with the network device 116. The service provider of the wireless network(s) and the service provider associated with the network device 116 may be the same. The wireless access point may store the network credentials 122. Some or all of the network credentials 122 may be stored in an encrypted or hashed form.

The network device 116 may be in communication with a network, such as a network 105. The network device 116 may facilitate the connection of a device, such as the user device 102, to the network 105 or a portion of the network 105 (e.g., a sub-network, one or more wireless service provider networks, etc . . . ). The network device 116 may be configured as a network gateway and/or an access point. The network device 116 may be configured to allow one or more wireless devices to connect to a wired and/or wireless network using Wi-Fi, BLUETOOTH®, cellular, long-term evolution (LTE), fourth generation wireless (4G), fifth generation wireless 5G, or any other wireless communication technique.

The network device 116 may be configured as a mesh network. The network device 116 may comprise a multi-band, multi-protocol, multi-communication technique, wireless network device. The network device 116 may be configured with a first service set identifier (SSID) to function as a local network for a particular user or users (e.g., associated with a user network or private network). The network device 116 may be configured with a second service set identifier (SSID) (e.g., associated with a public/community network, hidden network, or limited services (e.g., provisioning) network) to function as a secondary network or redundant network for connected communication devices. The network device 116 may be accessed through the use of network credentials 122. The network credentials 122 may be stored on the network device 116 and may comprise information such as SSIDs, passwords, security settings, combinations thereof, and the like. Some or all of the network credentials 122 may be stored in an encrypted or hashed form.

The network device 116 may comprise an identifier 118. The identifier 118 may be a media access control address (MAC address). The identifier 118 may be a unique identifier for facilitating communications on the physical network segment. Each of the network device 116 may comprise a distinct identifier 118. The identifiers 118 may be associated with a physical location of the network device 116.

The network device 116 may be in communication with the computing device 104 to provide the computing device 104 with up-to-date network credentials 122. The network device 116 may be configured to transmit the network credentials 122 to the computing device 104 upon detecting a change in the network credentials 122 or the network device 116 may transmit the network credentials 122 to the computing device 104 periodically (e.g., every hour, every day, etc . . . ). The network device 116 may transmit the identifier 118 with the network credentials 122 to aid in proper updating of data stored in the database 114. The computing device 104 may be a server for communicating with the user device 102 through the network 105 via the network device 116. The computing device 104 may communicate with the user device 102 for providing services. The computing device 104 may allow the user device 102 to interact with remote resources, such as data, devices, and files. The computing device may be configured as central location (e.g., a headend, or processing facility), which may receive content (e.g., data, input programming) from multiple sources. The computing device 104 may combine the content from the various sources and may distribute the content to user (e.g., subscriber) locations via a distribution system.

The computing device 104 may manage the communication between the user device 102 and a database 114 for sending and receiving data therebetween. The user device 102 may request and/or retrieve a file from the database 114. The database 114 may store information relating to the user device 102 (such as the address element 110, and/or the service element 112), information related to a user of the user device 102 (such as user account information), network credentials 122 related to one or more networks/network devices that the user/user device 102 access (e.g., a network device 116). The network credentials 122 may comprise information such as SSIDs, passwords, passcodes, passphrases, security settings, combinations thereof, and the like for one or more networks (e.g., network 105, local area network, wide area network, wireless service provider network, provisioning network, etc . . . ) and/or network devices (e.g., the network device 116, the computing device 104, etc . . . ) utilized by users and/or user devices for which user account information is stored. The network credentials 122 may comprise network credentials (e.g., routine network credentials, previously provisioned network credentials, updated network credentials, a network identifier, a service set identifier (SSID), a security element, a passcode, a password, etc . . . ) for accessing the network device 116 or one or more other network devices.

The computing device 104 may obtain the device identifier 108 from the user device 102 and retrieve information from the database 114, such as the address element 110 and/or the service elements 112. The computing device 104 may obtain the address element 110 from the user device 102 and may retrieve the service element 112 from the database 114, or vice versa. The computing device 104 may obtain the device identifier 108 from the user device 102 and may retrieve user account information and/or network credentials associated with the network device 116. The computing device 104 may obtain a MAC address from the user device 102 and may retrieve a local IP address from the database 114. As such, the local IP address may be provisioned to the user device 102 as the address element 110 to facilitate interaction between the user device 102 and a network (e.g., LAN). Any information may be stored in and retrieved from the database 114. The database 114 may be disposed remotely from the computing device 104 and accessed via direct or indirect connection. The database 114 may be integrated with the computing system 104 or some other device or system. The computing device may be configured as other devices, such as a user device or a network device.

The computing device 104 may receive network credentials 122 from the network device 116. The computing device 104 may determine what user account information is associated with the network device 116 and update the network credentials 122 stored in the database 114 accordingly.

The computing device 104 may comprise a token processor 120. The token processor 120 may be configured to generate a token, validate a token, and the like. A token may be generated in response to a request received from the user device 102. A token may be generated in response to creation of a user account and/or storage of user account information in the database 114. A user may request a new token to be generated and also at the same time identify the data that is to be shared using the token (e.g., identify one or more networks for which network credentials should be shared).

The token processor 120 may create an identifier for the token that may be used to access the data from the database 114. An identifier may include a pointer or reference to a storage location in the database 114, an index to the storage location in the database 114, a URL, the device identifier 108, the address element 110, the service element 112, combinations thereof, and/or the like. A globally unique identifier may be generated. Various different techniques such as calculating a cryptographic hash of the data, etc. may be used to generate the identifier for the token. The data in the database 114 may be encrypted.

The token processor 120 may create a unique encryption key for the token. The encryption key may be a symmetric encryption key which may be used to encrypt data and also to decrypt the encrypted data. Some or all of the data in the database 114 may then be encrypted using the encryption key, or only data associated with the user and/or user device 102 that requested the token may be encrypted using the encryption key. Various different encryption technologies may be used. The generated token may thus comprise information such as the identifier and may be encrypted with and/or may include the encryption key. In another aspect, the generated token is not encrypted and does not comprise an encryption key.

The token processor 120 may determine whether a token is valid. Token validity may be determined by determining one or more conditions, such as length of time a token may be valid, a number of validation requests for which a token may be valid, a particular network that the token is being used to request access to, combinations thereof, and the like. Additionally, validating the token may comprise verifying that the token is transmitted by a proper authority (e.g., the computing device), and/or verify that the token is in proper form (e.g., proper data structure, proper format, properly encoded, not expired, not used more than a threshold number of times, etc.). In another aspect, validating the token may comprise verifying that token comprises data/information that correlates to data/information stored by the computing device 104. Further, validating the token may comprise the computing device 104 determining whether the token has been previously revoked, marked invalid, or otherwise rejected.

In operation, the user device 102 (e.g., a computing device, a smartphone, a laptop, a tablet, a set top box, a display device, etc.) may connect to a first network, such as a LAN associated with a first wireless communication information (e.g., a first SSID, cellular information (e.g., long-term evolution (LTE) information, fourth generation wireless (4G) information, fifth generation wireless (5G) information, etc . . . ), short-range wireless communication information (e.g., BLUETOOTH® information, infrared information, near-field information, etc . . . ) via the network device 116. The beacon 124 may be associated with any type of wireless communication. The user device 102 may discover the beacon 124 comprising a SSID (e.g., the first SSID) transmitted (e.g., wirelessly) by the network device 116. The beacon may comprise information to facilitate a connection between the user device 102 and the network device 116.

The beacon and/or the SSID may be transmitted using one or more wireless communication techniques and/or over one or more channels or frequency bands. The user device 102 may be configured to support 2.4 GHZ and 5 GHZ bands for Wi-Fi. Within the 2.4 GHz band, multiple channels (e.g., channels 1-11 (in the United States) and 1-14 (outside the United States) may be used. The 2.4 GHz band may comprise 2412 MHz-2484 MHz. The 5 GHz band may comprise one or more channels governed by many possible regulations between channel 7 and 196 (or any other channels), between 4915 MHz and 5825 MHz (or any other frequency band). Any number of channels where regulations allow may be used to broadcast a beacon and transmit data.

The user device 102 may be unable to connect to the first network via the beacon 124. The user device 102 may be unable to connect to the first network via the beacon 124 due to a change in and/or lack ok of information associated with the beacon 124, such as a SSID, a password, a passcode, a passphrase, BLUETOOTH® beacon information, cellular information (e.g., LTE, 4G, 5G, etc.), or the like. The SSID and/or password stored in the network credentials 122 for the first network no longer matches the SSID and/or password for the first network stored and used as the network credentials 122 by the network device 116. The user device 102 may connect to a second network via a beacon 126. The first network and the second network may be associated with and/or a part of a single physical network, such as a local area network and/or a wide area network. The first network and the second network may be different physical signaling sublayers of a physical network. The first network and the second network may be associated with different channels of a physical layer component (e.g., coaxial cable, T1 cable T3 cable, Ethernet, fiber, etc . . . ). The second network may be configured to provide less functionality than the first network. The second network may be configured to provide only a provisioning function to enable the user device 102 to connect to the first network. The second network may be a subnetwork of the first network. The first network may be a subnetwork of the second network. The first network and the second network may be subnetworks of a third network. The first network and the second network may be networks within and/or associated with the third network. The first network and the second network may be part of a single network (e.g., the third network).

The first network and the second network may be two independent wireless networks (e.g., WLANs) created using a single access point (e.g., network device 116, access point 204 (FIG. 2), access point 305 (FIG. 3), access point 405 (FIG. 4), etc . . . ). It should be noted that more than two networks are also contemplated. The single access point may be configured to support two WLAN networks in a dual frequency channel scheme. A beacon frame (e.g., the beacon 124, the beacon 126, beacon 207a (FIG. 2), beacon 207b (FIG. 2), etc . . . ) may be understood as a management frame in IEEE 802.11 based WLANs. A beacon frame may be associated with associated with any type of wireless communication, such as Wi-Fi, cellular (e.g., long-term evolution (LTE), fourth generation wireless (4G), fifth generation wireless (5G), etc . . . ), BLUETOOTH®, and/or the like. The beacon frame may contain some or all the information about a network. Beacon frames may be transmitted periodically to announce the presence of a Wireless LAN network. Beacon frames may be transmitted by the access point, e.g., the network device 116, the access point 204 (FIG. 2), the access point 305 (FIG. 3), and the access point 405 (FIG. 4), in an infrastructure BSS.

The proliferation of wireless communications has produced dense networks of access points that share the same communication (e.g., transmission, radio, network, etc . . . ) environment, creating a phenomenon known as co-channel interference. Transmission of real time services, like video-streaming or any high data rate services, may be hampered by the interference created by nearby wireless LAN transmitting devices.

In this situation it becomes advisable to work in the best operating frequency channel, the less interfered one. In the case when the channel is dynamically interfered a method for changing to the best frequency channel may be used. Working in the less interfered channel entails an improvement in WLAN link performance, achieving better received signal-to-noise ratio (SNR) and communication throughput. A technique for increasing throughput and avoiding interference is to have a dual transceiver in WLAN devices (e.g., the network device 116, the access point 204 (FIG. 2), the access point 305 (FIG. 3), the access point 405 (FIG. 4), etc.), which allows supporting WLAN communications in other frequency bands or channels, if the first one is interfered. In addition, it may be useful to prioritize the wireless transmissions that the user considers of high priority. This may be achieved by assigning a non-interfered, or lightly interfered, channel, leaving the other interfered channels for low priority WLAN transmissions.

In IEEE 802.11, Wireless LAN Medium Access Control (MAC) and Physical Layer (PHY) Specifications IEEE 802.11-2016 incorporated herein by reference in its entirety, a variable length SSID field may contain an identity of an extended service set (ESS). The maximum length is 32 bytes, and when the SSID has a length of zero, it is considered to be the broadcast SSID. A Probe Request frame having a broadcast SSID causes all access points (e.g., the network device 116, the access point 204 (FIG. 2), the access point 305 (FIG. 3), and the access point 405 (FIG. 4), etc . . . ) to respond with a Probe Response frame. Its purpose is to stop other wireless equipment accessing the LAN—whether accidentally or intentionally. To communicate with the access point (AP), WLAN devices must be configured with the same SSID. If the 'Allow broadcast of SSID' command is unselected in a router or access point, the SSID of that device will not be visible in the other device's site survey, and, if a device wants to become associated with the router or access point the SSID must be entered manually.

The Extended Service Set Identification (ESSID) is one of two types of Service Set Identification (SSID) parameters. An ad-hoc wireless network with no access points uses the Basic Service Set Identification (BSSID). In an infrastructure wireless network that includes an access point (e.g., the network device 116, the access point 204 (FIG. 2), the access point 305 (FIG. 3), and the access point 405 (FIG. 4), etc . . . ), the Extended Service Set Identification (ESSID) is used—although it may still be referred to as SSID. IEEE 802.11 standard WLANs periodically broadcast or announce the identifier of the network. This is done by means of the beacon frame, typically each 100 ms. The beacon frame broadcasts some or all of the following information (about 40 bytes): MAC address of the router; Name of the network (32 bytes maximum for SSID); Time; Periodicity of the beacon; Information bits that define the network type (ad-hoc, infrastructure . . . ); and other parameters.

Dual SSID transmission allows the creation of simultaneous WLANs from the same access point (e.g., the network device 116, the access point 204 (FIG. 2), the access point 305 (FIG. 3), and the access point 405 (FIG. 4), etc . . . ). In the case of dual SSID, two beacon frames may be sent every 100 ms. Dual SSID broadcasting allows creating two networks with one same access point or router, which may be termed virtual local area networks (VLAN). One network may be reserved for public, and the other network may be reserved for private use. Dual or Multiple SSID transmissions may share the same frequency channel and medium capacity. There are also devices that include a WLAN switch. The WLAN switch provides an independent connectivity to each of the VLAN, with different security requirements.

Access points (e.g., the network device 116, the access point 204 (FIG. 2), the access point 305 (FIG. 3), and the access point 405 (FIG. 4), etc . . . ) may be configured with dual frequency band transceivers, which allow dual channel WLAN transmission, each one with one or more different SSID. One transceiver may operate in the 2.4 GHz band and the other transceiver may operate in the 5 GHz band. In some instances, the dual frequency transceivers may be in the same frequency band, the 5 GHz band, allowing dual transmissions in the 5 GHz band. Dual band may support the 802.11a and 802.11n standards in the 5 GHz band and standards 802.11b, 802.11g, and 802.11n in the 2.4 GHz legacy band. Unlike access points that only supports one signal band, dual-band access points contains two different types of wireless transceivers that may support connections with both 2.4 GHz and 5 GHz links. The two bands may be used as independent transmission communication channels, not allowing the transfer of information and communications data from one to another.

The user device 102 may determine whether a token is stored on the user device 102. If the user device 102 has a stored token, the user device 102 may transmit the token with a request for network credentials for the first network to the computing device 104 via the second network. The computing device 104 may use the token processor 120 to determine if the received token is valid, and if so, determine user account information and associated network credentials using an identifier obtained from the token. The computing device 104 will unencrypt the token to determine the identifier. The token may further comprise an identification of a user and/or the user device 102 and in some aspects, may comprise an identification of specific networks/network devices. The computing device 104 may transmit the network credentials 122 stored in the database 104 to the user device 102 via the second network. The user device 102 may disconnect from the second network and use the new network credentials to access the first network via the beacon 124.

If the user device 102 does not have a stored token, the user device 102 may transmit a request for a token to the computing device 104 via the second network. The request may comprise the device identifier 108, the address element 110, the service element 112, user account login information, combinations thereof, and the like. The computing device 104 may use the token processor 120 to determine if the request is from an authorized user/user device and, if so, generate a token and transmit the token to the user device 102 via the second network. The user device 102 may then use the token as described above to request network credentials for accessing the first network.

Figure 2:
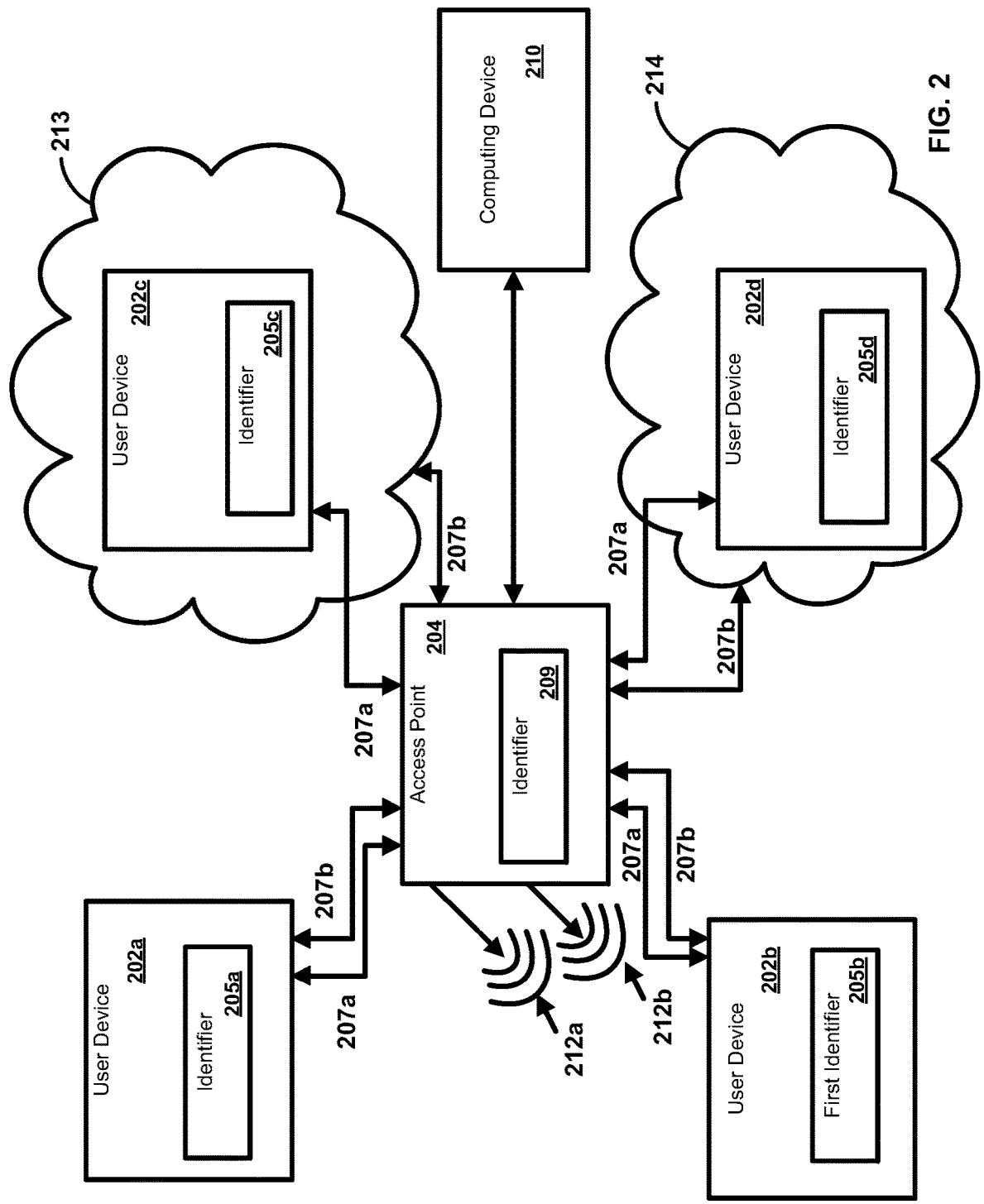
FIG. 2 shows a system for connecting to a network.

FIG. 2 illustrates an exemplary system and network. A plurality of user devices 202a, 202b, 202c, 202d may be in communication with an access point 204. One or more user devices 202a, 202b, 202c, 202d may be a computing device, a communication device, a computer, a smartphone, a laptop, a tablet, a set top box, a display device, or other device capable of communicating with one or more of the user devices 202a, 202b, 202c, 202d of the network.

The user devices 202a, 202b, 202c, 202d may be associated with user identifiers or device identifiers 205a, 205b, 205c, 205d. The device identifiers 205a, 205b, 205c, 205d may be any identifier, token, character, string, or the like, for differentiating one user or user device (e.g., user device 202a) from another user or user device. In a further aspect, the device identifiers 205a, 205b, 205c, 205d may identify a user or user device as belonging to a particular class of users or user devices. The device identifiers 205a, 205b, 205c, 205d may comprise information relating to the user device, such as a manufacturer, a model or type of device, a service provider associated with the user devices 202a, 202b, 202c, 202d, a state of the user devices 202a, 202b, 202c, 202d, a locator, and/or a label or classifier. Other information may be represented by the device identifiers 205a, 205b, 205c, 205d. The identifiers 205a, 205b, 205c, 205d may be an internet protocol address, a MAC address, a network address, an Internet address, or the like. The identifiers 205a, 205b, 205c, 205d may be relied upon to establish a communication session between the user devices 202a, 202b, 202c, 202d and the computing device 210 or other devices (e.g., access point 204) and/or networks. The identifiers 205a, 205b, 205c, 205d may be used as an identifier or locator of the user devices 202a, 202b, 202c, 202d. The identifiers 205a, 205b, 205c, 205d may be persistent for a particular network and/or location.

The user devices 202a, 202b may be configured as a network, such as a mesh network. The user devices 202c, 202d may be configured as part of separate networks, such as network 213 and network 214, respectively. The network 213 and the network 214 may be associated with different wireless network service providers.

The access point 204 and/or one or more user devices 202a, 202b, 202c, 202d may comprise a multi-communication type (e.g., Wi-Fi, cellular (e.g., LTE, 4G, 5G, etc . . . ), dual band wireless network device. A first network 207a or service may be provided. The first network 207a may be configured with a first service set identifier (SSID) (e.g., associated with a user network or private network) to function as a local network for a particular user or users. The network 207a may be associated with any type of wireless communication technique. A second network 207b or service may be provided. The second network 207b may enable the user devices 202c, 202d to connect to and/or be in communication with the first network 207a or any other network.

The first network 207a and the second network 207b may be associated with and/or a part of a single physical network, such as a local area network and/or a wide area network. The first network 207a and the second network 207b may be two independent wireless networks created by, supported by, and/or associated with a single access point (e.g., an access point that supports multiple SSIDs, an access point with multiple transceivers, the network device 116, the access point 204, the access point 305 (FIG. 3), the access point 405 (FIG. 4), etc . . . ). The first network 207a and the second network 207b may be different physical signaling sublayers of a physical network. The first network 207a and the second network 207b may be associated with different channels of a physical layer component (e.g., coaxial cable, T1 cable T3 cable, Ethernet, fiber, etc . . . ). The second network 207b may be configured to provide less functionality than the first network 207a. The second network 207b may be configured to provide only a provisioning function to enable a user device (e.g., the user devices 202a, 202b, 202c, 202d) to connect to the first network 207a. The second network 207b may be a subnetwork of the first network 207a. The first network 207a may be a subnetwork of the second network 207b. The first network 207a and the second network 207b may be subnetworks of a third network (not shown). The first network 207a and the second network 207b may be networks within and/or associated with the third network (not shown). The first network 207a and the second network 207b may be part of a single network (e.g., the third network) within which the second network 207b may be configured to provide less functionality than the first network 207a. The second network 207b may be configured to provide only a provisioning function to enable a user device to connect to the first network 207a. The second network 207b may be configured with a second service set identifier (SSID) (e.g., associated with a public/community network, a hidden network, or a limited services (e.g., provisioning) network) to function as a secondary network or redundant network for connected communication devices.

One or more of the user devices 202a, 202b, 202c, 202d may comprise an identifier 205a, 205b, 205c, 205d. One or more identifiers may be a media access control address (MAC address). Any uniquely identifiable attribute that may be linked to a location may be used as the identifier 205a, 205b, 205c, 205d. Such attributes may comprise one or more of an IP Address, serial number, latitude/longitude, geo-encoding, custom assigned unique identifier, global unique identifier (GUID), and the like. One or more identifiers 205a, 205b, 205c, 205d may be a unique identifier for facilitating communications on the physical network segment. Each of the user devices 202a, 202b, 202c, 202d may comprise a distinct identifier 205a, 205b, 205c, 205d. The identifiers 205a, 205b, 205c, 205d may be associated with a physical location of the user devices 202a, 202b, 202c, 202d.

One or more user devices 202a, 202b, 202c, 202d may be in communication with the access point 204. One or more user devices 202a, 202b, 202c, 202d and/or the access point 204 may be configured to allow one or more wireless devices to connect to a wired and/or wireless network using Wi-Fi, cellular (e.g., LTE, 4G, 5G, etc . . . ), BLUETOOTH® or similar standard. The access point 204 may comprise an identifier 209. One or more identifiers 209 may be a media access control address (MAC address). The one or more identifiers 209 may be a unique identifier for facilitating communications on the physical network segment.

A computing device 210 may be in communication with a network device, such as access point 204. The computing device 210 may be or comprise an application server, management device, auto-configuration server (ACS), AAA server, provisioning server, etc. The computing device 210 is located within the second network, such as a wide area network (WAN).

The user devices 202a, 202b, 202c, 202d may connect to a first network via a network device, such as access point 204. The user devices 202a, 202b, 202c, 202d may discover one or more beacons 212a, 212b transmitted (e.g., wirelessly) by the access point 204. The one or more beacons 212a, 212b may comprise information to facilitate a connection between the user devices 202a, 202b, 202c, 202d and the access point 204. The one or more beacons 212a, 212b may comprise or relate to one or more SSIDs. A first beacon 212a may be associated with a first SSID and/or a first service (e.g., the first network 207a). A second beacon 212b may be associated with a second SSID and/or a second service (e.g., the second network 207b). The beacons 212a, 212b may be associated with any type of wireless communication technique, such as Wi-Fi, cellular (e.g., LTE, 4G, 5G, etc . . . ), BLUETOOTH®, and the like.

The one or more beacons 212a, 212b may be transmitted via any type of wireless communication technique, such as Wi-Fi, cellular (e.g., LTE, 4G, 5G, etc . . . ), BLUETOOTH®, and the like. The one or more beacons 212a, 212b and/or an SSID may be transmitted over one or more channels or frequency bands. The user devices 202a, 202b, 202c, 202d may be configured to support 2.4 GHZ and 5 GHZ bands for Wi-Fi. Within the 2.4 GHz band, multiple channels (e.g., channels 1-11 (in the United States) and 1-14 (outside the United States) may be used. The 2.4 GHz band may comprise 2412 Mhz-2484 Mhz. The 5 Ghz band may comprise one or more channels governed by many possible regulations between channel 7 and 196 (or any other channels), between 4915 Mhz and 5825 Mhz (or any other frequency band). Any number of channels where regulations allow may be used to broadcast a beacon (e.g., one or more beacons 212a, 212b) and transmit data.

The user devices 202a, 202b, 202c, 202d might not be able to access one or more networks or services. The one or more network service may be services that the user devices 202a, 202b, 202c, 202d have accessed previously and/or are otherwise authorized to access. The one or more services may be services that the user devices 202a, 202b, 202c, 202d have been provisioned, such as during a new purchase and/or onboarding process. Network credentials necessary to access the access point 204 and/or one or more networks (e.g., the network 207a, the network 213, the network 214, a network managed by a service provider, etc . . . ). The network credentials may have changed since the access point was previously accessed. An SSID (or any other wireless communication information) for the network 207a may have changed, or a password associated with the network 207a may have changed. The user devices 202a, 202b, 202c, 202d may connect to the access point 204 via the second beacon 212b as an alternative to the first beacon 212a. The access point 204 may facilitate communication between the user devices 202a, 202b, 202c, 202d and the computing device 210 via the second beacon 212b (e.g., the second network 207b). In aspect, the access point 204 may continuously make the second beacon 212b available or may make the second beacon 212b available only when a change has been made to a network credential for the first network 207a. Such operation may enable the user devices 202a, 202b, 202c, 202d to communicate with the computing device 210 to obtain data, information, and/or configurations associated with the first beacon 212a (e.g., request a token, receive network credentials such as a changed or new SSID and/or a password) as described in FIG. 1. Such operation may be repeated for one or more devices 202a, 202b, 202c, 202d. Additionally, during a device onboarding (e.g., provisioning, etc . . . ) procedure, devices 202a, 202b, 202c, 202d may connect to the access point 204 via the second beacon 212b to gain access to the second network 207b. The 202a, 202b, 202c, 202d may obtain network credentials necessary to connect to any other network (e.g., the network 207a, the network 213, the network 214, etc . . . ). The devices 202a, 202b, 202c, 202d may connect to and/or be in communication with another access point (not shown), such as an access point managed by a wireless service provider, that is connected to/in communication with the access point 204 via the second beacon 212b to gain access to the second network 207b.

Figure 3:
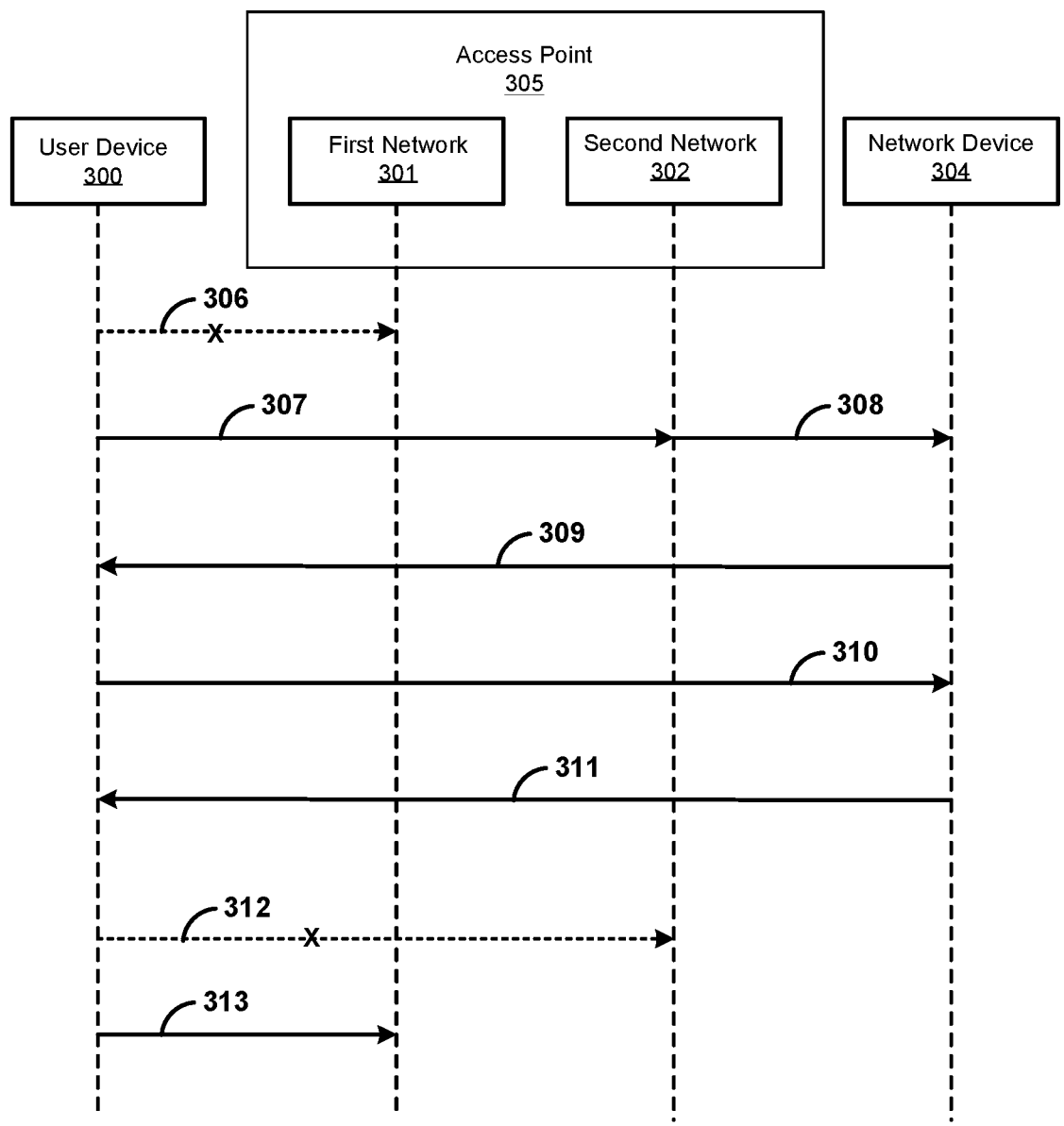
FIG. 3 shows a data flow for connecting a device to a wireless network.

FIG. 3 shows a data flow for a user device 300 failing to connect to a first network 301 when a token associated with the first network 301 is not stored by the user device 300. Further, FIG. 3 shows a data flow for a user device 300 connecting to a second network 302 (e.g., the second network 207b) via an access point 304 to obtain configuration information (e.g., network credentials) that will enable the user device 300 to connect to the first network 301. The access point 304 may broadcast a wireless network according to an IEEE 802.11 standard, an IEEE 802.15 standard, or any other wireless broadcast standard.

The user device 300 (e.g., user device 202a) may determine a failure to connect to a first network 301 (e.g., the first network 207a) associated with a first SSID broadcast by an access point 304 (e.g., the access point 204) at 305. The failure to connect to the first network 301 by the user device 300 may be based on a changed SSID or new SSID being configured for the first time and the user device 300 not being configured to connect to the first network 301 via the changed SSID or new SSID. A new SSID may describe a SSID that is used for a newly configured network for which no previous SSID exists. A changed SSID may describe an SSID associated with a network that has been updated or modified. Based on the determined failure to connect to the first network 301, the user device 300 may connect to a second network 302 (e.g., second network 207b) associated with a second SSID broadcast by the access point 304 at 306. The second SSID may be static. In other words, the second SSID is not changed frequently, if at all. The second network 302 may be a secure network but with limited functionality. The second network 302 may be limited to providing a communications link between the user device 300 and the remote computing device 303 (e.g., a network device, communication device 210, a provisioning server, etc.) for the purposes of updating the user device 300 to be able to connect to the first network 301.

The access point 304 may facilitate a connection between the user device 300 and a remote computing device 303 (e.g., communication device 210, provisioning server, etc.) at 307. The connection between the user device 300 and the remote computing device 303 may be a secure connection. The connection between the user device 300 and the remote computing device 303 may be protected using security protocols, such as Wired Equivalent Privacy (WEP), Wi-Fi Protected Access (WPA), WPA2, and/or the like.

When a secure connection between the user device 300 and the remote computing device 303 is established, the user device 300 may be provisioned for accessing the first network 301 using an identifier associated with the user device 300 (e.g., identifier 205) by associating the identifier of the user device 300 with a given user account. Alternatively, a user of the user device 300 may be prompted for login information associated with a user account (e.g., a userid, a password, an account, a phone number, etc.) that uniquely associates the user device 300 to the user account. The user account may be associated with the first network 301.

When the user device 300 is successfully associated with a user account and/or is successfully associated with the first network 301, the remote computing device 303 may provide the user device 300 with a token by transmitting the token to the user device 300 at 308. The token may uniquely associate the user device 300 with a given user account and further associate the user device 300 with the first network 301. The token may be stored, saved, and/or otherwise persisted at the user device 300. When the user device 300 has a token (e.g., the token has recently been provided by the remote computing device 303, the token is already stored/persisted at the user device 300, etc.) the user device 300 may transmit the token to the remote computing device 303 and the remote computing device 303 may validate (e.g., approve, accept, authorize, etc.) the token at 309. Alternatively, the remote computing device 303 may revoke, deny, or otherwise reject the token by determining that the token is invalid and designating the token as invalid, thus terminating any further attempt by the user device 300 to connect to the first network 301.

When the remote computing device 303 validates the token, the remote computing device 303 may determine the user account associated with the user device 300 and the access point 304 used by the user device 300 to connect to the remote computing device 303. Based on the determination of the associated user account and access point 304, the remote computing device 303 may provide (e.g., transmit) a network credential to the user device 300 at 310. The network credential may comprise SSID (e.g., changed SSID or new SSID) and security (e.g., password, security element, etc.) information associated with the first network 301.

When the user device 300 receives the network credential, the network credential may be used by the user device 300 to connect to the first network 301. The user device 300 may disconnect from the second network 302 associated with the second SSID at 311. When the user device 300 disconnects from the second network 302, the user device 300 may connect to the first network 301 based on the network credential at 312. The user device 300 may remain connected to the first network 301 as long as the information associated with the first network 301 and comprised in the network credential remains unchanged. The user device 300 may connect to the first network 301 prior to disconnecting from the second network 302.

Figure 4:
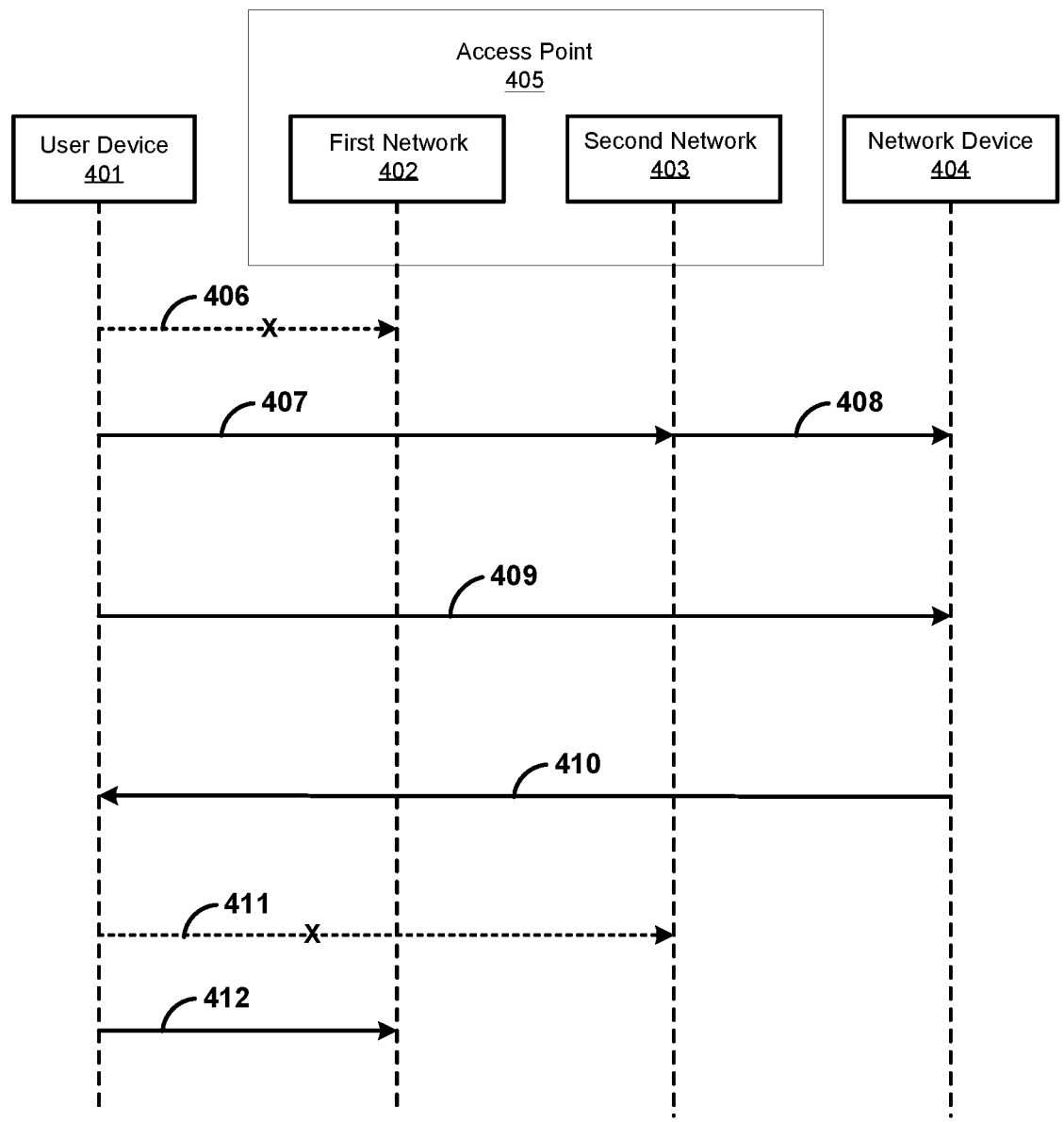
FIG. 4 shows a data flow for connecting a device to a wireless network.

FIG. 4 shows a data flow for a user device 400 failing to connect to a first network 401 when a token associated with the first network 401 is stored by the user device 400. Further, FIG. 4 shows a data flow for a user device 400 connecting to a second network 402 (e.g., the second network 207b) via an access point 404 to validate a token that may enable the user device 400 to connect to the first network 401, and connecting to the first network 401. The access point 404 may broadcast a wireless network according to an IEEE 802.11 standard, an IEEE 802.15 standard, or any other wireless broadcast standard.

A user device (e.g., the user device 202a) may determine a failure to connect to a first network 401 (e.g., the first network 207a) associated with a first SSID broadcast by an access point 404 (e.g., the access point 204) at 405. The access point 404 may be associated with and/or managed by a service provider. The user device 400 may be associated with a network that is associated with and/or managed by a different service provider than the access point 404. The user device 400 may be associated with a network that is associated with and/or managed by the same service provider as the access point 404. The failure to connect the user device 400 to the first network 401 may be based on changed, new, or unknown network credentials. The failure to connect the user device 400 to the first network 401 may be based on a changed SSID, new SSID, or unknown SSID and the user device 400 not being configured to connect to the first network 401 via the changed SSID, new SSID, or unknown SSID. A new SSID or unknown SSID may describe an SSID that is used for a newly configured network for which no previous SSID exists. A changed SSID may describe an SSID associated with a network that has been updated or modified. Based on the determined failure to connect to the first network 401, the user device 400 may connect to a second network 402 (e.g., the second network 207b) associated with a second SSID broadcast by the access point 404 at 406. The access point 404 may facilitate a connection between the user device 400 and a remote computing device 403 (e.g., communication device 210, a provisioning server, etc.) at 407. The connection between the user device 400 and the remote computing device 403 may be a secure connection. The connection between the user device 400 and the remote computing device 403 may be protected using security protocols, such as Wired Equivalent Privacy (WEP), Wi-Fi Protected Access (WPA), WPA2, and/or the like.

When a secure connection between the user device 400 and the remote computing device 403 is established, the user device 400 may transmit the token to the remote computing device 403 and the remote computing device 403 may validate (e.g., approve, accept, authorize, etc.) the token at 408. Alternatively, the remote computing device 403 may revoke, deny, or otherwise reject the token by determining that the token is invalid and designating the token as invalid, thus terminating any further attempt by the user device 400 to connect to the first network 401.

When the remote computing device 403 validates the token, the remote computing device 403 may determine the user account associated with the user device 400 and the access point 404 used by the user device 400 to connect to the remote computing device 403. Based on the determination of the associated user account and access point 404, the remote computing device 403 may provide (e.g., transmit) a network credential to the user device 400 at 409. The network credential may comprise SSID (e.g., changed SSID, new SSID) and security (e.g., password, security element, etc.) information associated with the first network 401.

When the user device 400 receives the network credential, the network credential may be used by the user device 400 to connect to the first network 401. The user device 400 may disconnect from the second network 402 associated with the second SSID at 410. When the user device 400 disconnects from the second network 402, the user device 400 may connect to the first network 401 based on the network credential at 411. The user device 400 may remain connected to the first network 401 as long as the information associated with the first network 401 and comprised in the network credential remains unchanged. The user device 400 may connect to the first network 401 prior to disconnecting from the second network 402.

Figure 5:
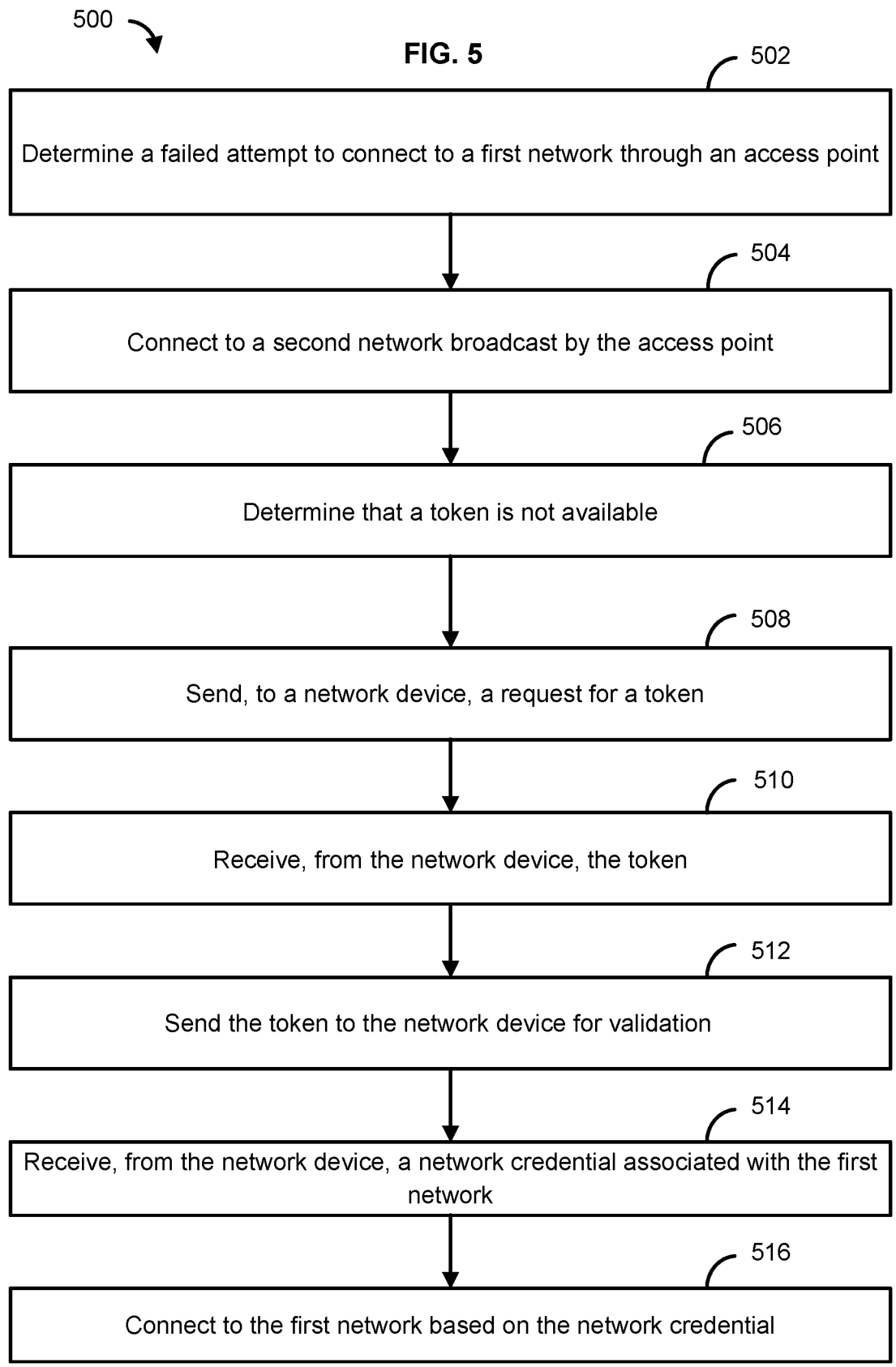
FIG. 5 shows a flowchart of a method for connecting to a network.

FIG. 5 shows a flowchart of a method 500. In step 502 a computing device (e.g., the user device 202a) may determine a failed attempt to connect to a first network (e.g., first network 207a) via a first identifier (e.g., first SSID) through an access point (e.g., access point 204). The failure to connect may be based on a configuration associated with the first network. The configuration associated with the first network may comprise an updated identifier, a new identifier, an updated security element (e.g., password), a new security element associated with the first network, combinations thereof, and the like. The first network may comprise a wireless network (e.g., a network operating according to the IEEE 802.11 standard, the IEEE 802.15 standard, and/or any other wireless broadcast standards). The first network may comprise a local network configured to facilitate communication among communication devices (e.g., user devices) present inside or within the close vicinity of a premises. The first network may be maintained and accessed by a specific subscriber. The first network may comprise a network protected using Wired Equivalent Privacy (WEP), Wi-Fi Protected Access (e.g., WPA2), or other similar security protocols. The first network may be a portion of, associated with, and/or within another network (e.g., network 105). Further, the first network may comprise and/or be associated with a second network (e.g., a subnetwork). The first network and the second network may be associated with and/or a part of a single physical network, such as a local area network and/or a wide area network. The first network and the second network may be two wireless networks created by, supported by, and/or associated with a single access point (e.g., an access point that supports multiple SSIDs, an access point with multiple transceivers, the network device 116, the access point 204 (FIG. 2), the access point 305 (FIG. 3), the access point 405 (FIG. 4), etc . . . ). The first network and the second network may be associated with and/or a part of a single physical network, such as a local area network and/or a wide area network. The first network and the second network may be different physical signaling sublayers of a physical network. The first network and the second network may be associated with different channels of a physical layer component (e.g., coaxial cable, T1 cable T3 cable, Ethernet, fiber, etc . . . ). The second network may be configured to provide less functionality than the first network. The second network may be configured to provide only a provisioning function to enable a user device (e.g., the user device 102, the user devices 202a, 202b, 202c, 202d, the user device 300, the user device 400) to connect to the first network.

In step 504, the computing device may connect to the second network (e.g., second network 207b) via a second identifier (e.g., second SSID) broadcast by the access point. The second network may be a portion of, associated with, and/or within another network (e.g., the first network, network 105, etc . . . ). The second network may comprise a wireless network (e.g., a network operating according to the IEEE 802.11 standard, the IEEE 802.15 standard, and/or any other wireless broadcast standards). The second network may comprise a limited services network, such as a network designated to only provide service provisioning (e.g., provisioning Wi-Fi parameters and/or credentials). The second network may be configured to provide a secure connection for service provisioning. The second network may comprise a network protected using Wired Equivalent Privacy (WEP), Wi-Fi Protected Access (e.g., WPA2), or other similar security protocols. The computing device may be configured such that the computing device may automatically connect to a network associated with a second SSID whenever the first network is unreachable, unavailable, and/or the like.

In step 506, the computing device may determine that a token is not available. The token may comprise data that may associate the computing device to the first network, to a user, to a user account, combinations thereof, and the like. The token may comprise information indicating the computing device is associated with the first network and authorized to connect to the first network. In another aspect, the computing device determining that a token is not available may comprise determining that the token is not stored by the computing device.

In step 508, the computing device may transmit to a remote computing device (e.g., computing device 210, provisioning device, etc.) via the second network, a request for a token. The request for a token may comprise information that associates the computing device to the first network to a user, to a user account, combinations thereof, and the like. The request may comprise a userid, a password, an account, a phone number, etc. In response to the request, the remote computing device may require user credentials be received from the computing device. The user credentials may comprise a userid, a password, an account, a phone number, etc. The remote computing device may generate the token based on the request (e.g., confirming that an authorized userid and/or password were provided).

In step 510, the computing device may receive the token from the remote computing device. When the token is received by the computing device from the remote computing device, the token may be stored, saved, or otherwise persisted by the computing device. The token may be stored in memory by the computing device. The token may be stored by the computing device either temporarily or permanently.

In step 512, the computing device may then transmit the token back to the remote computing device for validation. Validating the token may comprise associating the token with the computing device, the first network, a user, a user account, combinations thereof, and the like. Additionally, validating the token may comprise verifying that the token is transmitted by a proper authority (e.g., the computing device), and/or verify that the token is in proper form (e.g., proper data structure, proper format, properly encoded, not expired, not used more than a threshold number of times, etc.). In another aspect, validating the token may comprise verifying that data/information comprised in the token correlates to data/information stored by the remote computing device. Further, validating the token may comprise the remote computing device determining whether the token has been previously revoked, marked invalid, or otherwise rejected.

In step 514, after the token is validated by the remote computing device, the computing device may receive, from the remote computing device, a network credential associated with the first network. The network credential may comprise identifier information (e.g., SSID) and security information. The network credential may comprise an updated identifier, a new identifier, an updated security element (e.g., password), a new security element, combinations thereof, and the like, associated with the first network. If the first SSID associated with the first network is initialized for the first time or changed (e.g., a user selects a new SSID and/or password for the first network, or a user changes the SSID and/or password associated with the first network), the network credential may comprise details associated with the new SSID or changed SSID as well as any associated security elements, such as a password. The network credential may automatically be stored by the remote computing device.

Figure 6:
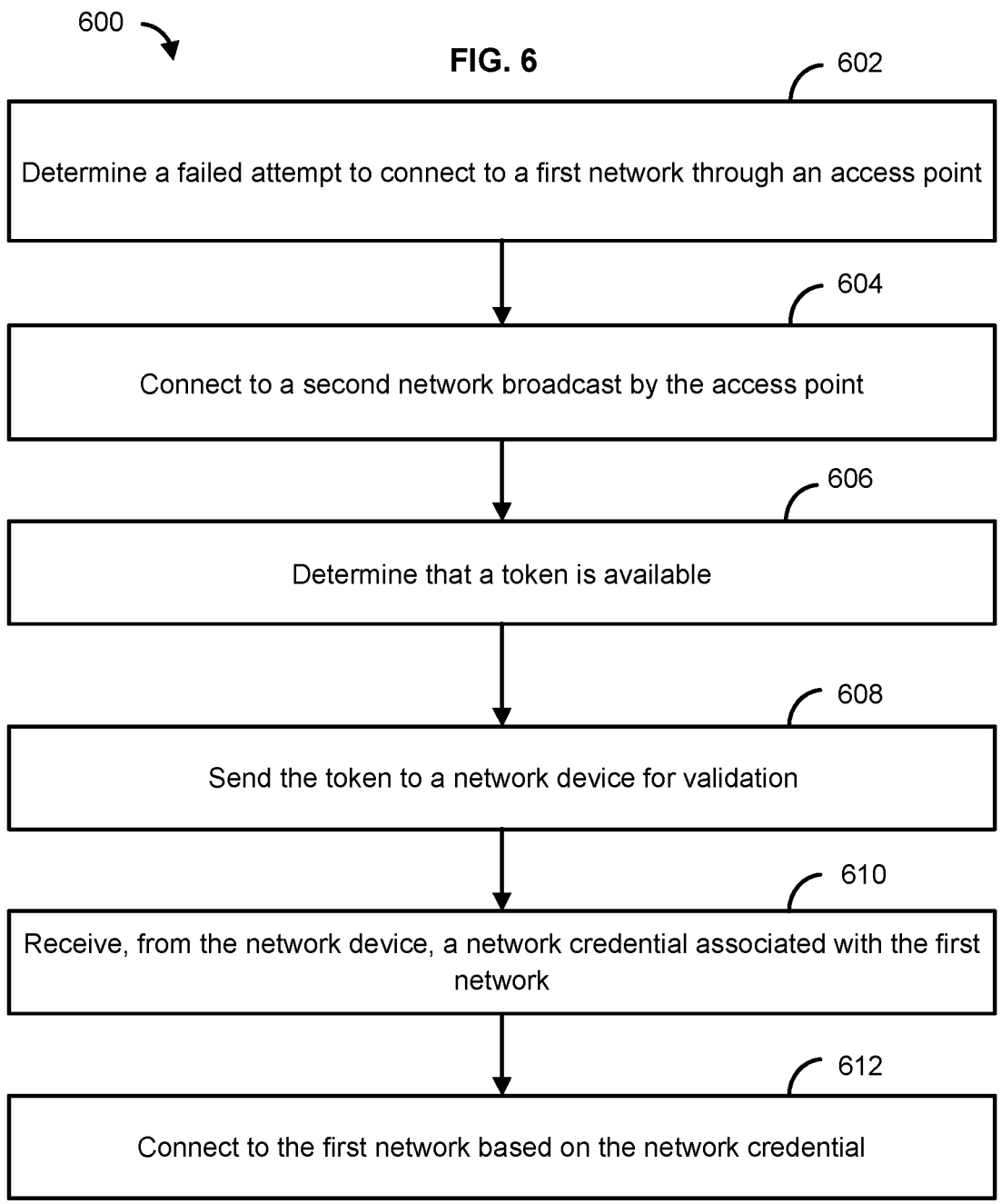
FIG. 6 shows a flowchart of a method for connecting to a network.

In step 516, in response to the computing device receiving the network credential, the computing device may connect to the first network based on the network credential. The computing device may connect to the first network based on the identifier and security element FIG. 6 shows a flowchart of a method 600. In step 602 a computing device (e.g., the user device 202a) may determine a failed attempt to connect to a first network (e.g., first network 207a) via a first identifier (e.g., first SSID) through an access point (e.g., access point 204). The failure to connect may be based on a configuration associated with the first network. The configuration associated with the first network may comprise an updated identifier, a new identifier, an updated security element (e.g., password), a new security element, combinations thereof, and the like, associated with the first network. The first network may comprise a wireless network. The first network may comprise a wireless network (e.g., a network operating according to the IEEE 802.11 standard, the IEEE 802.15 standard, and/or any other wireless broadcast standards). The first network may comprise a local network configured to facilitate communication among communication devices (e.g., user devices) present inside or within the close vicinity of a premises. The first network may be maintained and accessed by a specific subscriber. The first network may comprise a network protected using Wired Equivalent Privacy (WEP), Wi-Fi Protected Access (e.g., WPA2), or other similar security protocols. The first network may be a portion of, associated with, and/or within another network (e.g., network 105). Further, the first network may comprise and/or be associated with a second network (e.g., a subnetwork). The first network and the second network may be associated with and/or a part of a single physical network, such as a local area network and/or a wide area network. The first network and the second network may be two wireless networks created by, supported by, and/or associated with a single access point (e.g., an access point that supports multiple SSIDs, an access point with multiple transceivers, the network device 116, the access point 204 (FIG. 2), the access point 305 (FIG. 3), the access point 405 (FIG. 4), etc . . . ). The first network and the second network may be associated with and/or a part of a single physical network, such as a local area network and/or a wide area network. The first network and the second network may be different physical signaling sublayers of a physical network. The first network and the second network may be associated with different channels of a physical layer component (e.g., coaxial cable, T1 cable T3 cable, Ethernet, fiber, etc . . . ). The second network may be configured to provide less functionality than the first network. The second network may be configured to provide only a provisioning function to enable a user device (e.g., the user device 102, the user devices 202a, 202b, 202c, 202d, the user device 300, the user device 400) to connect to the first network.

In step 604, the computing device may connect to the second network (e.g., second network 207b) via a second identifier (e.g., second SSID) broadcast by the access point. The second network may be a portion of, associated with, and/or within another network (e.g., the first network, network 105, etc . . . ). The second network may comprise a wireless network. The second network may comprise a wireless network (e.g., a network operating according to the IEEE 802.11 standard, the IEEE 802.15 standard, and/or any other wireless broadcast standards). The second network may comprise a limited services network, such as a network designated to only provide service provisioning and Wi-Fi credential. The second network may be configured to provide a secure connection for service provisioning. The second network may comprise a network protected using Wired Equivalent Privacy (WEP), Wi-Fi Protected Access (e.g., WPA2), or other similar security protocols. The user device may be configured such that the user device may automatically connect to a network associated with a second SSID whenever the first network is unreachable, unavailable, and/or the like.

In step 606, the computing device may determine that a token is available. The token may associate the computing device to the first network, to a user, to a user account, combinations thereof, and the like. The token may comprise information indicating the computing device is associated with the first network and authorized to connect to the first network. In another aspect, the computing device determining that a token is available may comprise determining that the token is stored by the computing device.

In step 608, the computing device may transmit the token to the network device for validation. Validating the token may comprise associating the token with the computing device, the first network, a user, a user account, combinations thereof, and the like. Additionally, validating the token may comprise verifying that the token is transmitted by a proper authority (e.g., the computing device), and/or verify that the token is in proper form (e.g., proper data structure, proper format, properly encoded, not expired, not used more than a threshold number of times, etc.). In another aspect, validating the token may comprise verifying that data/information comprised in the token correlates to data/information stored by the remote computing device. Further, validating the token may comprise the remote computing device determining whether the token has been previously revoked, marked invalid, or otherwise rejected.

In step 610, after the token is validated by the network device, the computing device may receive, from the network device, a network credential associated with the first network. The network credential may comprise identifier information (e.g., SSID) and security information. The network credential may comprise an updated identifier, a new identifier, an updated security element (e.g., password), a new security element, combinations thereof, and the like, associated with the first network. If the first SSID associated with the first network is initialized for the first time or changed (e.g. a user selects a new SSID and/or password for the first network, or a user changes the SSID and/or password associated with the first network) the details associated with the new SSID or changed SSID as well as any associated security elements, such as a password, may be comprised in the network credential. The network credential may automatically be stored by the network device.

In step 612, in response to the computing device receiving the network credential, the computing device may connect to the first network based on the network credential. The computing device may connect to the first network based on the identifier and security element comprised in the network credential.

Figure 7:
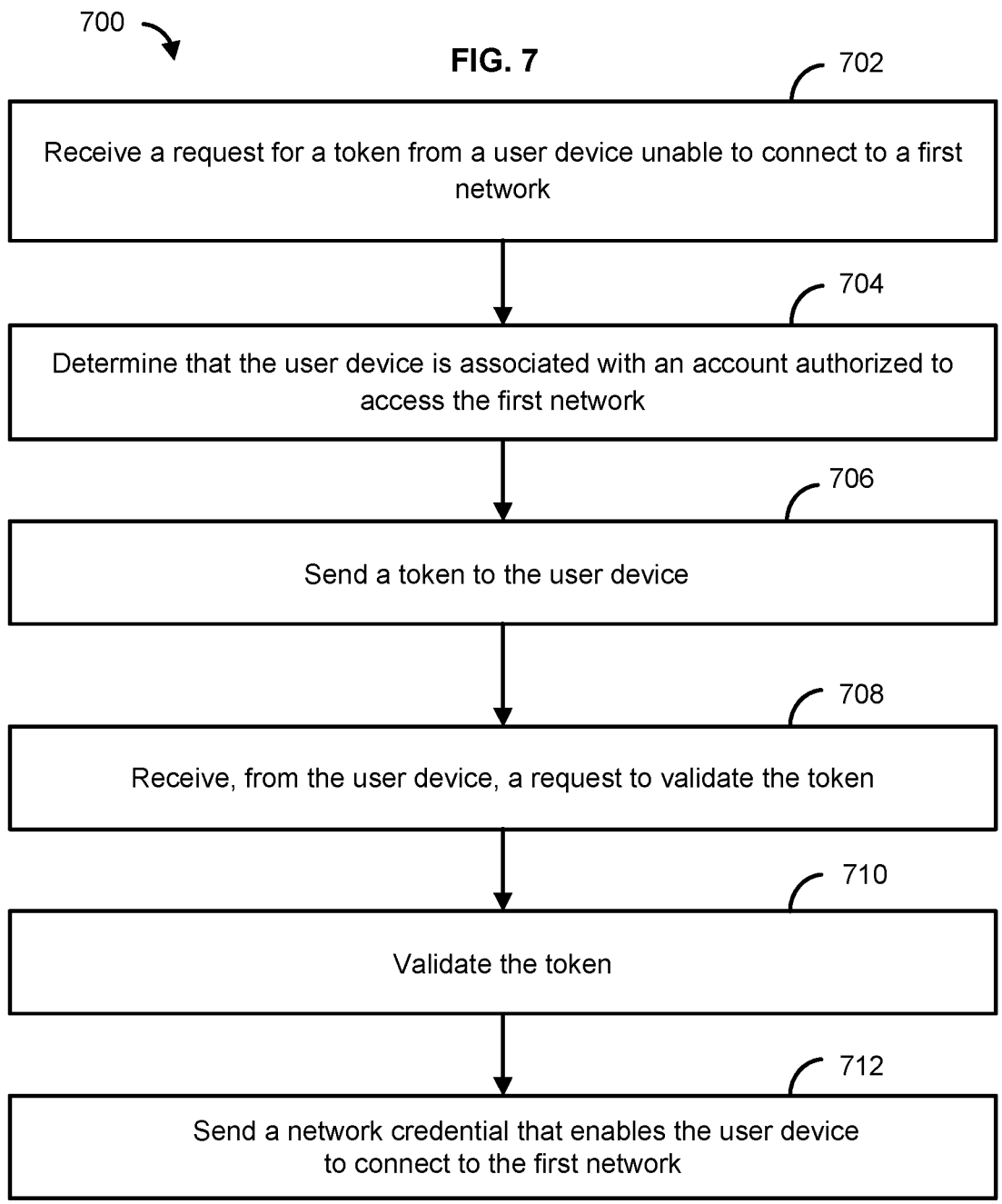
FIG. 7 shows a flowchart of a method for connecting to a network.

FIG. 7 shows a flowchart of a method 700. In step 702 a remote computing device (e.g., computing device 210, provisioning device) may receive, from a computing device (e.g., user device 202*a*) a request for a token. A token may comprise information indicating the computing device is associated with a first network (e.g., first network 207*a*) and authorized to connect to the first network. The request for a token may comprise information that associates the computing device to a first network, to a user, to a user account, combinations thereof, and the like. The request may comprise a userid, a password, an account, a phone number, etc. In response to the request, the network device may require user credentials be received from the computing device. The user credentials may comprise a userid, a password, an account, a phone number, etc.

In another aspect, the network device receiving, from the computing device, the request for a token may be based on a failed attempt by the computing device to connect to the first network via a first identifier (e.g., first SSID) through an access point (e.g., access point 204). The failure to connect may be based on a configuration associated with the first network. The configuration associated with the first network may comprise an updated identifier, a new identifier, an updated security element (e.g., password), and a new security element associated with the first network. The first network may comprise a wireless network. The first network may comprise a wireless network (e.g., a network operating according to the IEEE 802.11 standard, the IEEE 802.15 standard, and/or any other wireless broadcast standards). The first network may comprise a first network, such as a home network (e.g., a local network) configured to facilitate communication among communication devices (e.g., user devices) present inside or within the close vicinity of a home. The first network may be maintained and accessed by a specific subscriber. The first network may comprise a network protected using Wired Equivalent Privacy (WEP), Wi-Fi Protected Access (e.g., WPA2), or other similar security protocols. The first network may be a portion of, associated with, and/or within another network (e.g., network 105). Further, the first network may comprise and/or be associated with a second network (e.g., a subnetwork).

The first network and the second network may be associated with and/or a part of a single physical network, such as a local area network and/or a wide area network. The first network and the second network may be two wireless networks created by, supported by, and/or associated with a single access point (e.g., an access point that supports multiple SSIDs, an access point with multiple transceivers, the network device 116, the access point 204 (FIG. 2), the access point 305 (FIG. 3), the access point 405 (FIG. 4), etc . . . ). The first network and the second network may be associated with and/or a part of a single physical network, such as a local area network and/or a wide area network. The first network and the second network may be different physical signaling sublayers of a physical network. The first network and the second network may be associated with different channels of a physical layer component (e.g., coaxial cable, T1 cable T3 cable, Ethernet, fiber, etc . . . ). The second network may be configured to provide less functionality than the first network. The second network may be configured to provide only a provisioning function to enable a user device (e.g., the user device 102, the user devices 202*a*, 202*b*, 202*c*, 202*d*, the user device 300, the user device 400) to connect to the first network.

The network device may be associated with the second network. The second network may be a portion of, associated with, and/or within another network (e.g., the first network, network 105, etc . . . ). The second network may comprise a wireless network. The second network may comprise a wireless network (e.g., a network operating according to the IEEE 802.11 standard, the IEEE 802.15 standard, and/or any other wireless broadcast standards). The second network may comprise a limited services network, such as a network designated to only provide service provisioning and Wi-Fi credential. The second network may be configured to provide a secure connection for service provisioning. The second network may comprise a network protected using Wired Equivalent Privacy (WEP), Wi-Fi Protected Access (e.g., WPA2), or other similar security protocols. The user device may be configured such that the user device may automatically connect to a network associated with a second SSID whenever the first network is unreachable, unavailable, and/or the like.

In step 704, the network device may determine that the computing device is associated with an account authorized to access the first network. Determining that the computing device is associated with an account authorized to access the first network may comprise verifying information that associates the computing device to the first network. The request for a token may comprise a userid, a password, an account, a phone number, etc. that associated the computing device to the first network. Determining that the computing device is associated with an account authorized to access the first network may comprise the network device requiring user credentials be received from the computing device. The user credentials may comprise a userid, a password, an account, a phone number, etc.

In step 706, based on the determination that the computing device is associated with an account authorized to access the first network, the network device may generate and transmit a token to the computing device. The token may be generated in response to a request received from the user device 102. A token may be generated in response to creation of a user account and/or storage of user account information in the database 114. A user may request a new token to be generated and also at the same time identify the data that is to be shared using the token (e.g., identify one or more networks for which network credentials should be shared). Generating the token may comprise generating an identifier. The identifier may be used to associate the token with the user account information. The identifier may comprise an identifier contained with the user account information, such as an e-mail address, a username, a user number, and the like. In a further aspect, generating the token may comprise generating an encryption key. The encryption key may be the same encryption key used to encrypt user account information associated with the user requesting the token.

In step 708, the network device may receive, from the computing device, a request to validate the token. In step 710, the network device may validate the token. Validating the token may comprise associating the token with the computing device and/or the first network. Validating the token may comprise associating the token with the computing device, the first network, a user, a user account, combinations thereof, and the like. Additionally, validating the token may comprise verifying that the token is transmitted by a proper authority (e.g., the computing device), and/or verify that the token is in proper form (e.g., proper data structure, proper format, properly encoded, not expired, not used more than a threshold number of times, etc.). In another aspect, validating the token may comprise verifying that data/information comprised in the token correlates to data/information stored by the remote computing device. Further, validating the token may comprise the remote computing device determining whether the token has been previously revoked, marked invalid, or otherwise rejected.

In step 712, in response to the token being validated, the network device may transmit, to the computing device, a network credential associated with the first network. The network credential may comprise identifier information (e.g., SSID) and security information. The network credential may comprise an updated identifier, a new identifier, an updated security element (e.g., password), and a new security element associated with the first network. If the first SSID associated with the first network is initialized for the first time or changed (e.g. a user selects a new SSID and/or password for the first network, or a user changes the SSID and/or password associated with the first network) the details associated with the new SSID or changed SSID as well as any associated security elements, such as a password, may be comprised in the network credential. The network credential may automatically be stored by the network device. The network credential associated with the first network may enable the computing device to connect to the first network based on the network credential.

Figure 8:
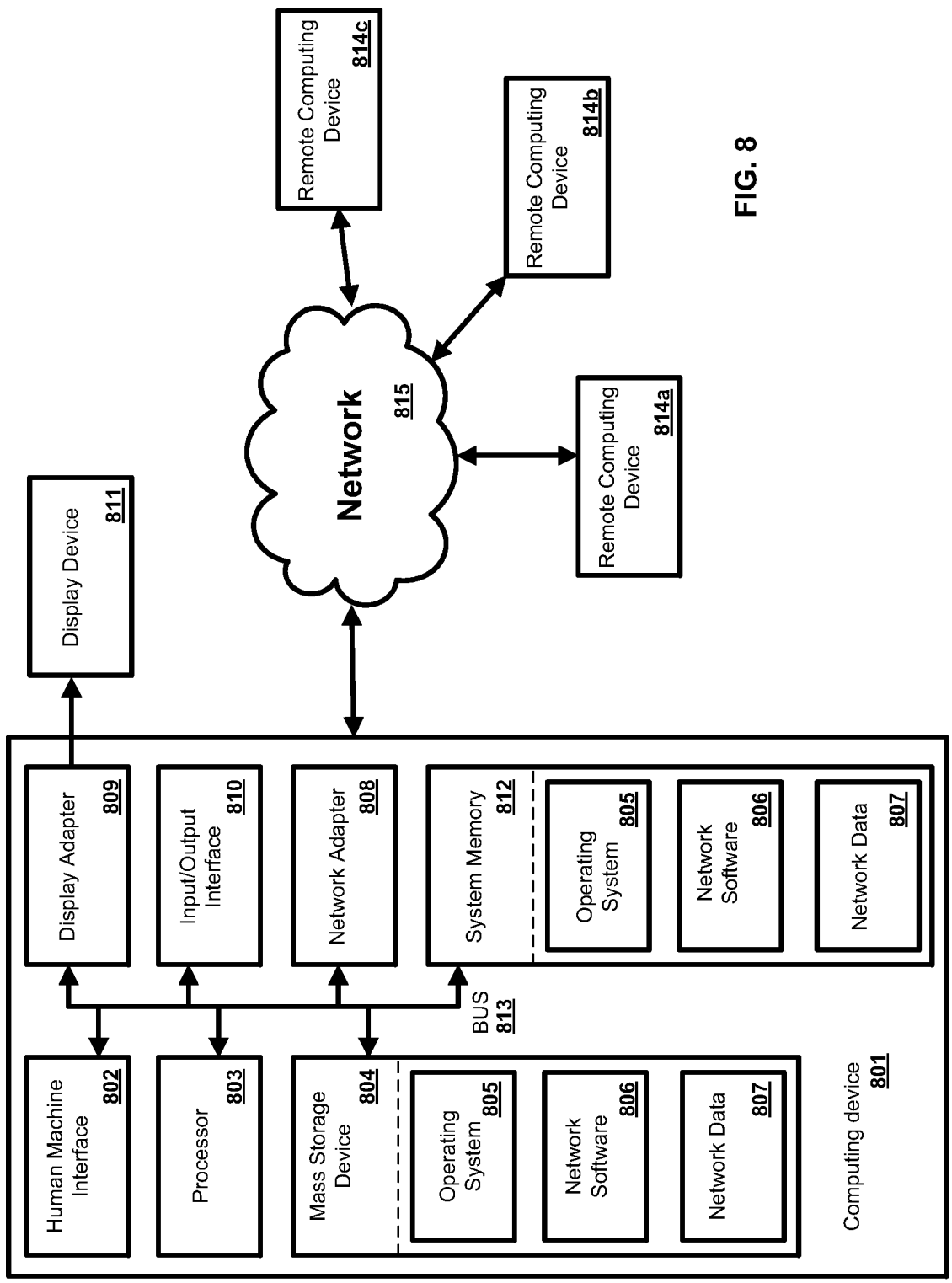
FIG. 8 shows a block diagram of a computing device for implementing connecting to a network.

FIG. 8 shows a system 800 for automatically connecting to a network. The user device 102, the network device 116, the computing device 104, the user devices 202a, 202b, 202c, 202d, the access point 204, the computing device 210, the user device 300, the access point 305, the network device 304, the user device 400, the access point 405, and the network device 404 may be a computer 801 as shown in FIG. 8.

The computer 801 may comprise one or more processors 803, a system memory 812, and a bus 813 that couples various components of the computer 801 including the one or more processors 803 to the system memory 812. In the case of multiple processors 803, the computer 801 may utilize parallel computing.

The bus 813 may comprise one or more of several possible types of bus structures, such as a memory bus, memory controller, a peripheral bus, an accelerated graphics port, and a processor or local bus using any of a variety of bus architectures.

The computer 801 may operate on and/or comprise a variety of computer readable media (e.g., non-transitory). Computer readable media may be any available media that is accessible by the computer 801 and comprises, non-transitory, volatile and/or non-volatile media, removable and non-removable media. The system memory 812 has computer readable media in the form of volatile memory, such as random access memory (RAM), and/or non-volatile memory, such as read only memory (ROM). The system memory 812 may store data such as network data 807 and/or program modules such as operating system 805 and network software 806 that are accessible to and/or are operated on by the one or more processors 803.

The computer 801 may also comprise other removable/non-removable, volatile/non-volatile computer storage media. The mass storage device 804 may provide non-volatile storage of computer code, computer readable instructions, data structures, program modules, and other data for the computer 801. The mass storage device 804 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 804. An operating system 805 and network software 806 may be stored on the mass storage device 804. One or more of the operating system 805 and network software 806 (or some combination thereof) may comprise program modules and the network software 806. Network data 807 may also be stored on the mass storage device 804. Network data 807 may be stored in any of one or more databases known in the art. The databases may be centralized or distributed across multiple locations within the network 815.

A user may enter commands and information into the computer 801 via an input device (not shown). Such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices may be connected to the one or more processors 803 via a human machine interface 802 that is coupled to the bus 813, but may be connected by other interface and bus structures, such as a parallel port, game port, an IEEE 1394 Port (also known as a Firewire port), a serial port, network adapter 808, and/or a universal serial bus (USB).

A display device 811 may also be connected to the bus 813 via an interface, such as a display adapter 809. It is contemplated that the computer 801 may have more than one display adapter 809 and the computer 801 may have more than one display device 811. A display device 811 may be a monitor, an LCD (Liquid Crystal Display), light emitting diode (LED) display, television, smart lens, smart glass, and/or a projector. In addition to the display device 811, other output peripheral devices may comprise components such as speakers (not shown) and a printer (not shown) which may be connected to the computer 801 via Input/Output Interface 810. Any step and/or result of the methods may be output (or caused to be output) in any form to an output device. Such output may be any form of visual representation, including, but not limited to, textual, graphical, animation, audio, tactile, and the like. The display 811 and computer 801 may be part of one device, or separate devices.

The computer 801 may operate in a networked environment using logical connections to one or more remote computing devices 814*a,b,c*. A remote computing device 814*a,b,c* may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. Logical connections between the computer 801 and a remote computing device 814*a,b,c* may be made via a network 815, such as a local area network (LAN) and/or a general wide area network (WAN). Such network connections may be through a network adapter 808. A network adapter 808 may be implemented in both wired and wireless environments. Such networking environments are conventional and commonplace in dwellings, offices, enterprise-wide computer networks, intranets, and the Internet.

Application programs and other executable program components such as the operating system 805 are shown herein as discrete blocks, although it is recognized that such programs and components may reside at various times in different storage components of the computing device 801, and are executed by the one or more processors 803 of the computer 801. An implementation of network software 806 may be stored on or sent across some form of computer readable media. Any of the disclosed methods may be performed by processor-executable instructions embodied on computer readable media.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

The invention claimed is:

1. One or more non-transitory computer-readable media storing processor- executable instructions that, when executed by at least one processor, cause the at least one processor to:

receive, by a network device, based on a failed attempt by a user device to connect to a first network via a first identifier broadcast by an access point, an identifier of the user device, wherein the identifier of the user device is received via a second network, wherein the second network is configured to provide a secure connection for provisioning services;

determine that the identifier of the user device is associated with an account authorized to access the first network;

send, to the user device, based on determining that the identifier of the user device is associated with the account, a token;

receive, from the user device, a request to validate the token;

validate, based on the request, the token; and send, to the user device, based on validating the token, a network credential, wherein the network credential facilitates a connection to the first network.

2. The one or more non-transitory computer-readable media of claim 1, wherein the processor-executable instructions, when executed by the at least one processor, cause the at least one processor to receive the identifier of the user device based on the user device connecting to the second network via a second identifier broadcast by the access point.

3. The one or more non-transitory computer-readable media of claim 1, wherein the failed attempt to connect to the first network is based on a configuration comprising at least one of: an updated identifier, a new identifier, an updated security element, or a new security element.

4. The one or more non-transitory computer-readable media of claim 1, wherein the processor-executable instructions, that when executed by the at least one processor, cause the at least one processor to determine that the identifier of the user device is associated with the account, further cause the at least one processor to determine that the identifier of the user device is associated with at least one of: user identification data associated with the account, security data associated with the account, or contact information associated with the account.

5. The one or more non-transitory computer-readable media of claim 1, wherein the network credential comprises at least one of an updated first identifier or a security element.

6. The one or more non-transitory computer-readable media of claim 1, wherein the processor-executable instructions, when executed by the at least one processor, further cause the at least one processor to:

generate the token by generating an identification element;

generate, based on the identification element, an encryption key; and encrypt, based on the encryption key, the token.

7. The one or more non-transitory computer-readable media of claim 1, wherein the processor-executable instructions, that when executed by the at least one processor, cause the at least one processor to validate the token, further cause the at least one processor to at least one of: determine whether the token has been previously revoked, determine whether the token has been marked invalid, or determine whether the token has been previously rejected.

8. A system comprising:

a network computing device configured to:

receive, based on a failed attempt by a user computing device to connect to a first network via a first identifier broadcast by an access point, an identifier of the user computing device, wherein the identifier of the user computing device is received via a second network, wherein the second network is configured to provide a secure connection for provisioning services;
determine that the identifier of the user computing device is associated with an account authorized to access the first network;
send to the user computing device, based on determining that the identifier of the user computing device is associated with the account, a token;
receive, from the user computing device, a request to validate the token;
validate, based on the request, the token; and
send to the user computing device, based on validating the token, a network credential, wherein the network credential facilitates a connection to the first network; and
the user computing device configured to:
receive, from the network computing device, the token;
send, to the network computing device, the request to validate the token; and
receive, from the network computing device, the network credential.

9. The system of claim 8, wherein to receive the identifier of the user computing device, the network computing device is configured to receive the identifier of the user computing device based on the user computing device connecting to the second network via a second identifier broadcast by the access point.

10. The system of claim 8, wherein the user computing device is further configured to fail in an attempt to connect to the first network based on a configuration comprising at least one of: an updated identifier, a new identifier, an updated security element, or a new security element.

11. The system of claim 8, wherein to determine that the identifier of the user computing device is associated with the account, the network computing device is configured to determine that the identifier of the user computing device is associated with at least one of: user identification data associated with the account, security data associated with the account, or contact information associated with the account.

12. The system of claim 8, wherein the network credential comprises at least one of an updated first identifier or a security element.

13. The system of claim 8, wherein the network computing device is further configured to:
generate the token by generating an identification element;
generate, based on the identification element, an encryption key; and
encrypt, based on the encryption key, the token.

14. The system of claim 8, wherein to validate the token, the network computing device is configured to at least one of: determine whether the token has been previously revoked, determine whether the token has been marked invalid, or determine whether the token has been previously rejected.

15. One or more non-transitory computer-readable media storing processor- executable instructions that, when executed by at least one processor, cause the at least one processor to:
receive, by a network device, based on a failed attempt by a user device to connect to a first network via a first identifier broadcast by an access point, an identifier of the user device, wherein the identifier of the user device is received via a second network, wherein the second network is configured to provide a secure connection for provisioning services;
determine that the identifier of the user device is associated with an account authorized to access the first network; and
send, to the user device, based on determining that the identifier of the user device is associated with the account, a token and a network credential, wherein the network credential facilitates a connection to the first network.

16. The one or more non-transitory computer-readable media of claim 15, wherein the processor-executable instructions, when executed by the at least one processor, further cause the at least one processor to validate the token, wherein validating the token causes another network credential to be sent to the user device.

17. The one or more non-transitory computer-readable media of claim 15, wherein the processor-executable instructions, when executed by the at least one processor, further cause the at least one processor to:
receive, from the user device, a request to validate the token;
validate, based on the request, the token; and
send to the user device, based on validating the token, another network credential associated with the first network, wherein the another network credential facilitates a connection to the first network.

18. The one or more non-transitory computer-readable media of claim 17, wherein the processor-executable instructions, that when executed by the at least one processor, cause the at least one processor to receive the request to validate the token, further cause the at least one processor to receive the request to validate the token based on another failed attempt by the user device to connect to the first network.

19. The one or more non-transitory computer-readable media of claim 15, wherein the failed attempt by the user device to connect to the first network is based on a configuration comprising at least one of: an updated identifier, a new identifier, an updated security element, or a new security element.

20. The one or more non-transitory computer-readable media of claim 15,
wherein the processor-executable instructions, when executed by the at least one processor, further cause the at least one processor to validate the token, and
wherein the processor-executable instructions, when executed by the at least one processor, that cause the at least one processor to validate the token, further cause the at least one processor to at least one of: determine whether the token has been previously revoked, determine whether the token has been marked invalid, or determine whether the token has been previously rejected.

21. A system comprising:
a network computing device configured to:
receive, based on a failed attempt by a user computing device to connect to a first network via a first identifier broadcast by an access point, an identifier of the user computing device, wherein the identifier of the user computing device is received via a second network, wherein the second network is configured to provide a secure connection for provisioning services;

determine that the identifier of the user computing device is associated with an account authorized to access the first network; and send, to the user computing device, based on determining that the identifier of the user computing device is associated with the account, a token and a network credential, wherein the network credential facilitates a connection to the first network; and the user computing device configured to:

receive, from the network computing device, the token and the network credential.

22. The system of claim 21, wherein the network computing device is further configured to validate the token, wherein the network computing device validating the token causes another network credential to be sent to the user computing device.

23. The system of claim 21, wherein the network computing device is further configured to:

receive, from the user computing device, a request to validate the token;

validate, based on the request, the token; and send to the user computing device, based on validating the token, another network credential associated with the first network, wherein the another network credential facilitates a connection to the first network; and wherein the user computing device is further configured to:

receive the another network credential.

24. The system of claim 23, wherein to receive the request to validate the token, the network computing device is configured to receive, based on another failed attempt by the user computing device to connect to the first network, the request to validate the token.

25. The system of claim 21, wherein the failed attempt by the user computing device to connect to the first network is based on a configuration comprising at least one of: an updated identifier, a new identifier, an updated security element, or a new security element.

26. The system of claim 21, wherein the network computing device is further configured to validate the token, wherein to validate the token, the network computing device is configured to at least one of: determine whether the token has been previously revoked, determine whether the token has been marked invalid, or determine whether the token has been previously rejected.

* * * * *